(12) United States Patent
Gyurdiev

(10) Patent No.: US 11,094,092 B2
(45) Date of Patent: Aug. 17, 2021

(54) SYSTEMS AND METHODS FOR LABELING AREAS ON AN AIRPORT MAP

(71) Applicant: THE BOEING COMPANY, Chicago, IL (US)

(72) Inventor: Valeri Ivanov Gyurdiev, Arvada, CO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/680,914

(22) Filed: Nov. 12, 2019

(65) Prior Publication Data

US 2021/0142527 A1 May 13, 2021

(51) Int. Cl.
*G06T 11/00* (2006.01)
*G09B 29/00* (2006.01)

(52) U.S. Cl.
CPC ............ *G06T 11/00* (2013.01); *G09B 29/003* (2013.01)

(58) Field of Classification Search
CPC .............................. G06T 11/00; G09B 29/003
See application file for complete search history.

(56) References Cited

U.S. PATENT DOCUMENTS

| | | | | |
|---|---|---|---|---|
| 2008/0109160 A1* | 5/2008 | Sacle | ..................... | G08G 5/065 701/33.4 |
| 2009/0157303 A1* | 6/2009 | Clark | .................. | G08G 5/0021 701/408 |
| 2013/0231853 A1* | 9/2013 | Feyereisen | ............. | G08G 5/065 701/120 |
| 2014/0354629 A1* | 12/2014 | Adlers | ............... | G01C 21/3673 345/419 |
| 2019/0114933 A1* | 4/2019 | Veronesi | ................ | B64D 45/00 |

FOREIGN PATENT DOCUMENTS

WO    WO 2018/222511    12/2018

OTHER PUBLICATIONS

Pschierer C., et al: "Embedded formats for airport mapping database," Proc. Spie, Helmet-and Head-Mounted Displays IV., vol. 6957, Apr. 15, 2008.
Extended European Search Report and Written Opinion for EP 20201285.2-1001/3833586, dated Apr. 21, 2021.

* cited by examiner

*Primary Examiner* — Maurice L. McDowell, Jr.
*Assistant Examiner* — Donna J. Ricks
(74) *Attorney, Agent, or Firm* — The Small Patent Law Group LLC; Joseph M. Butscher

(57) ABSTRACT

A system and method include generating, by a map labeling control unit including a processor, label candidates for areas of an airport map, evaluating, by the map labeling control unit, the label candidates to determine positions of labels for the areas of the airport map, and determining, by the map labeling control unit, different sets of labels to display for different views of the airport map.

26 Claims, 26 Drawing Sheets

| Full name | Abbreviation |
|---|---|
| Building | Bldg |
| Concourse | Conc |
| Domestic | Dom |
| East, Eastern | E |
| General | Gen |
| International | Intl |
| Memorial | Meml |
| Metropolitan | Metro |
| Municipal | Mun |
| National | Natl |
| North, Northern | N |
| Parking | Park |
| Passenger | Pass |
| Regional | Regl |
| South, Southern | S |
| Terminal | Tml |
| West, Western | W |

FIG. 11

| rawID | label text line 1 | label text line 2 |
|---|---|---|
| A16 | A16 | |
| A5_A5A | A5/A | |
| B4A_B4B | B4 | A/B |
| C1_C1A_C2B_C2C | C1/A | C2B/C |
| A_B_C_D_E | A:E | |
| D1_D2A_D3B_D4_D4C | D1/: | D4/ |
| X1_X2_X3_Y1_Y2_Y3 | X1:X3 | Y1:Y3 |

FIG. 27

SYSTEMS AND METHODS FOR LABELING AREAS ON AN AIRPORT MAP

FIELD OF THE DISCLOSURE

Embodiments of the subject disclosure generally relate to systems and methods for labeling areas on an airport map.

BACKGROUND OF THE DISCLOSURE

Aircraft are used to transport passengers and cargo between various locations. Numerous aircraft depart from and arrive at a typical airport every day.

Airport maps are used by pilots, air traffic controllers, and others to locate various areas of an airport. For example, an airport map is a digital, electronic representation of an airport that can be shown on a monitor, such as within a flight deck of an aircraft, at a workstation within a control tower, and/or the like. The airport map shows different areas of the airport, such as a control tower, terminals, runways, taxiways, parking stands proximate gates of terminals, aprons, deicing locations, and the like.

An airport map associates geometric shapes representative of areas of the airport with attributes that identify the associated areas. An attribute includes text that identifies the shape. For example, a shape representing a terminal is associated with an attribute that includes "terminal" or "term" as text. In short, the attribute includes a label for an associated geometric shape representative of an area of the airport.

The process of determining when and where text data for areas on an airport map are shown is time and labor intensive. Typically, mapping technicians analyze the airport map and determine and verify where labels for each area are shown based on a particular zoom or view of the airport map, and when the labels are shown. For example, the airport map at a first zoom may show labels for certain areas, but not others, as labeling all of the area at the first zoom would render the airport map difficult to understand as too many labels would conflict (for example, abut into, against, or cross) one another. As such, numerous hours are spent by mapping technicians to determine when and where the labels for the areas are shown on the airport map. In particular, it has been found that mapping technicians spend over three hundred hours revising an airport map in order to ensure accurate labeling of various areas on the airport map. That is, more than three hound hours are spent manually moving and adjusting labels for various areas on an airport map to ensure that the text, positions, and size of the labels are visible and intelligible.

SUMMARY OF THE DISCLOSURE

A need exists for a system and method for efficiently and effectively labeling areas on an airport map. Further, a need exists for a system and method for automatically labeling areas on an airport map. Moreover, a need exists for a system and method for labeling areas on an airport map that are not prone to human error.

With those needs in mind, certain embodiments of the subject disclosure provide a method including generating, by a map labeling control unit including a processor, label candidates for areas of an airport map, evaluating, by the map labeling control unit, the label candidates to determine positions of labels for the areas of the airport map, and determining, by the map labeling control unit, different sets of labels to display for different views of the airport map.

In at least one embodiment, the method also includes generating, by the map labeling control unit, a conflict graph regarding the labels that depicts one or more conflicts between two or more of the labels. In at least one embodiment, the method also includes resolving, by the map labeling control unit, the one or more conflicts between two or more of the labels.

As an example, the areas on the airport map include buildings of an airport as represented on the airport map. In at least one embodiment, said generating includes creating one label candidate in a center of a first area, generating a series of horizontal lines equidistantly from the center to a highest boundary and a lowest boundary of the first area, determining intersections with the first area, and identifying a middle point of a segment as a first label candidate. In at least one embodiment, said evaluating includes determining a quality metric for each of the label candidates.

As an example, the areas on the airport map include taxiways of an airport as represented on the airport map. In at least one embodiment, said generating includes determining segments of the taxiways to be labeled, determining a number of labels to place on the segments, and positioning labels along anchor lines of the segments. In at least one embodiment, said evaluating includes determining a quality metric for each of the label candidates. In at least one embodiment, the map labeling control unit segments each of the taxiways into polygonal elements.

As an example, the areas on the airport map include deicing locations of an airport as represented on the airport map. In at least one embodiment, said generating includes placing the label candidates equidistantly along geometry of centered sub-container labels. In at least one embodiment, said evaluating includes assigning qualities to the label candidates based on a center of a group geometry.

As an example, the areas on the airport map include helipads of an airport as represented on the airport map. In at least one embodiment, said generating includes assigning a helipad symbol, and placing the label candidates in a center of respective geometries. In at least one embodiment, said evaluating includes assigning a common quality value to each of the label candidates.

As an example, the areas on the airport map include parking stands of an airport as represented on the airport map. In at least one embodiment, the method further includes placing, by the map labeling control unit, parking stand features for each of the initial clusters into parking containers, and containerizing and grouping all of the parking stands in super-containers to be labeled. In at least one embodiment, the method further includes combining, by the map labeling control unit, at least two of the parking stands based on a last character. In at least one embodiment, said generating the label candidates includes generating the label candidates as a group. In at least one embodiment, said evaluating the label candidates includes evaluating the label candidates as a group.

As an example, the areas on the airport map include aprons of an airport as represented on the airport map.

In at least one embodiment, said determining the different sets of labels includes providing, by the map labeling control unit, first labels for first areas on the airport map at a first zoom level; providing, by the map labeling control unit, second labels for second areas on the airport map at a second zoom level that is less than the first zoom level; providing, by the map labeling control unit, third labels for third areas on the airport map at a third zoom level that is less than the second zoom level; and providing, by the map labeling control unit, fourth labels for fourth areas on the airport map at a fourth zoom level that is less than the third zoom level. In at least one embodiment, the first areas at the first zoom level include major buildings, the second areas at the second zoom level include major taxiways, the third areas at the third zoom level include all shown taxiways and deicing locations, and the fourth areas at the fourth zoom level include all shown parking stands.

Certain embodiments of the subject disclosure provide a system including a map labeling control unit including a processor that is configured to operate as described herein.

Certain embodiments of the subject disclosure provide a non-transitory computer-readable storage medium including executable instructions that, in response to execution, cause a map labeling control unit including a processor, to perform operations as described herein.

BRIEF DESCRIPTION OF THE DRAWINGS

FIG. 11 illustrates an abbreviation chart for buildings of an airport, according to an embodiment of the subject disclosure.

FIG. 27 illustrates a table that translates parking stand raw ID with displayed text, according to an embodiment of the subject disclosure.

DETAILED DESCRIPTION OF THE DISCLOSURE

Figure 1:
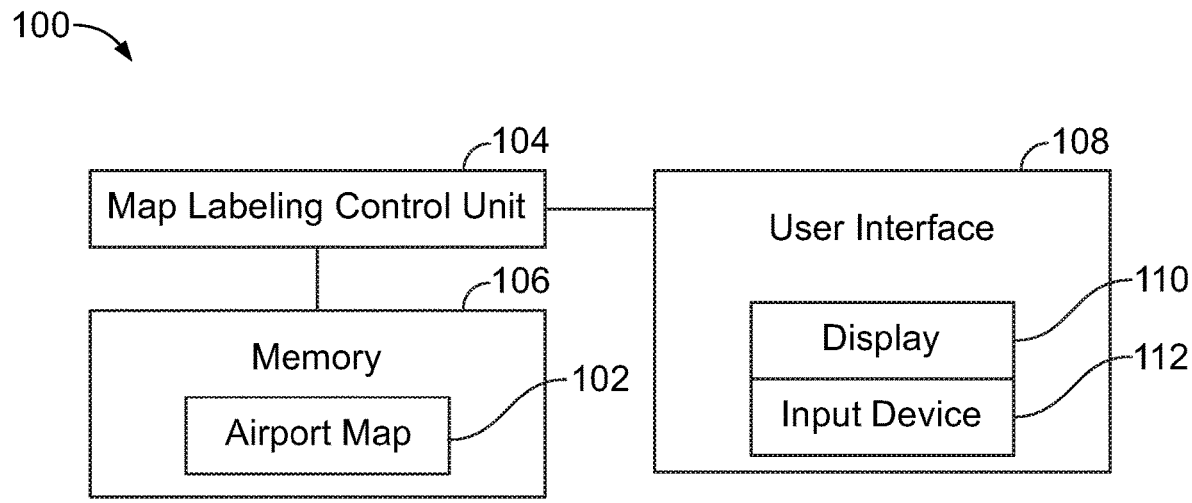
FIG. 1 illustrates a schematic block diagram of a system for labeling areas on an airport map, according to an exemplary embodiment of the subject disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising," "containing," including," or "having" an element or a plurality of elements having a particular condition can include additional elements not having that condition.

Certain embodiments of the subject disclosure provide systems and methods for presenting labels (for example, identifiers, indicators, or the like) of areas on an airport map. In at least one embodiment, the systems and methods include a map labeling control unit that is configured to selectively present the labels of the areas of an airport on the airport map. As an example, the map labeling control unit determines occurrences and positions of labels for areas of the airport map. The areas include buildings, such as terminals, a control tower, and hangars, runways, taxiways, parking stands, deicing locations, aprons, and the like.

In at least one embodiment, the map labeling control unit determines different sets of labels to display (for example, show on a display) for different views of the airport map. In at least one embodiment, the different views are different zoom levels of the airport map. The map labeling control unit generates complete label sets for areas of an airport map for a number of zoom levels, such as a max extent zoom level, a 4 km zoom level, a 2 km zoom level, and a 1 km zoom level. A zoom level is identified by a width of the airport map that fits in a fixed window of a display. In at least one embodiment, the sets of labels for the different zoom levels are independent of each other, even though some features may be labeled on multiple levels.

In at least one embodiment, the map labeling control unit executes a sequence of steps to create a label set for an airport. The map labeling control unit retrieves shape data from an airport map, then merges geometries into other features, preprocesses features (for example, containerizes), and then labels areas of each of the available zoom levels of the airport map.

Certain embodiments of the subject disclosure provide a method including generating, by a map labeling control unit, label candidates for areas of an airport map, and evaluating, by the map labeling control unit, the label candidates to determine positions of labels for the areas of the airport map.

Certain embodiments of the subject disclosure provide a system including a map labeling control unit that is configured to label candidates for areas of an airport map, and evaluate the label candidates to determine position of labels for the areas of the airport map.

Certain embodiments of the subject disclosure provide a non-transitory computer-readable storage medium comprising executable instructions that, in response to execution, cause a map labeling control unit comprising a processor, to perform operations comprising: generating label candidates for areas of an airport map, and evaluating the label candidates to determine positions of labels for the areas of the airport map As described herein, embodiments of the subject disclosure provide systems and methods that drastically reduce the amount of time spent by mapping technicians revising placement of labels for various areas of an airport on an airport map.

FIG. 1 illustrates a system 100 for labeling areas on an airport map 102, according to an exemplary embodiment of the subject disclosure. The system 100 includes a map labeling control unit 104 in communication with a memory 106 that stores the airport map 106, such as through one or more wired or wireless connections, and a user interface 108, such as through one or more wired or wireless connections. For example, the map labeling control unit 104 and the user interface 108 can include communication devices, such as antennas, transceivers, and/or the like, which allow for wireless communication therebetween. As another example, the map labeling control unit 104 and the user interface 108 can be in communication through an intermediate medium, such as through the Internet, a private communication network, and/or the like. In at least one embodiment, the memory 106 can be a part of the map labeling control unit 104.

The map labeling control unit 104 can be remotely located from locations of the memory 106 and the user interface 108, or can optionally be co-located with the memory 106 and/or the user interface 108. For example, the map labeling control unit 104 and the memory 106 can be at a land-based monitoring location, while the user interface 108 is onboard an aircraft. As another example, the map labeling control unit 104, the memory 106, and the user interface 108 can be at a common location, such as within an aircraft traffic control tower, onboard an aircraft, or the like.

In at least one embodiment, the user interface 108 can be part of a flight computer of an aircraft. As another example, the user interface 108 can be part of a separate computer workstation aboard the aircraft. As another example, the user interface 108 can be a handheld device, such as a smart phone, table, or the like, such as within the aircraft. As another example, the user interface 108 can be remotely located from the aircraft, such as at a flight planning center, air traffic control tower, and/or the like.

The user interface 108 includes a display 110 and an input device 112, both of which can be in communication with an operational control unit. The display 110 can be a monitor, screen, television, touchscreen, and/or the like. The input device 112 can include a keyboard, mouse, stylus, touchscreen interface (that is, the input device 112 can be integral with the display 110), and/or the like.

The airport map 102 provides a scaled representation of an airport that is configured to be shown on the display 110. The airport map 102 includes geometric shapes (or reference geometry) representative of various areas of the airport. The areas include terminals, runways, a control tower, taxiways, aprons, deicing locations, parking stands proximate to gates of the terminals, and the like. The geometric shapes are associated with attributes, such as text, that identify the geometric shapes as areas of the airport. For example, a geometric shape that represents a terminal is associated with an attribute, such as the word terminal. The geometric shapes and associated attributes of the airport map 102 are stored within the memory 106. The airport map 102 includes data representative of the shapes, attributes, and the like, which can be predefined. As described herein, the map labeling control unit 104 analyzes the various underlying data of the airport map to generate label candidates for display, evaluate the label candidates to determine positions of labels on a displayed version of the airport map 102, and determine sets of labels for different views of the airport map 102. The airport map 102, along with the underlying data, can be received from a data source, such as a planning or architecture datastore for an airport represented by the airport map 102. The airport map 102 and the underlying data can be user-defined, such as by planners, architects, engineers, and/or the like for the airport that is represented by the airport map 102. As described herein, the map labeling control unit 104 determines positions of labels (which are, include, or are otherwise associated with at least portions of the attributes) for the geometric shapes of the airport map 102 as shown in the display 110.

The map labeling control unit 104 performs the various operations and steps as described herein. For example, the map labeling control unit 104 automatically generates label candidates for areas (for example, buildings, taxiways, deicing locations, helipads, parking stands, aprons, and the like) of an airport map, and evaluates the label candidates to determine positions of labels. In at least one embodiment, the map labeling control unit 104 also generates conflict graphs, and resolves conflicts among labels of the airport map.

Figure 2:
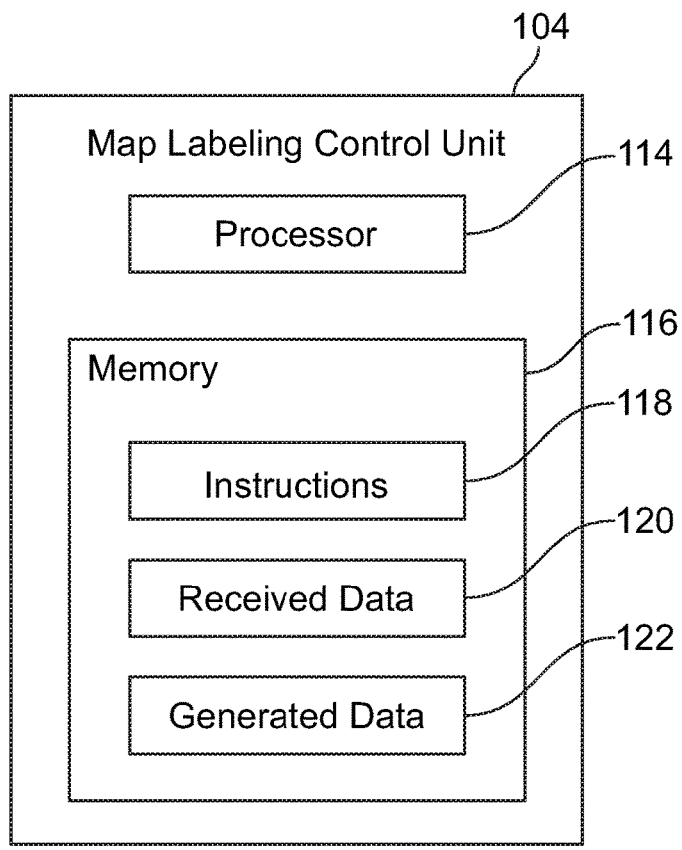
FIG. 2 illustrates a schematic block diagram of an example of a map labeling control unit, according to an embodiment of the subject disclosure.

FIG. 2 illustrates a schematic block diagram of an example of the map labeling control unit 104, according to an embodiment of the subject disclosure. In at least one embodiment, the map labeling control unit 104 includes at least one processor 114 in communication with a memory 116. The memory 116 can include or otherwise be the memory 106 shown in FIG. 1. Optionally, the memory 116 can be separate and distinct from the memory 106. The memory 116 stores instructions 118, received data 120, and generated data 122. The map labeling control unit 104 shown in FIG. 2 is merely exemplary, and non-limiting.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the map labeling control unit 104 can be or include one or more processors that are configured to control operation thereof, as described herein.

The map labeling control unit 104 is configured to execute a set of instructions that are stored in one or more data storage units or elements (such as one or more memories), in order to process data. For example, the map labeling control unit 104 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods are intended to comprise, without being limited to, these and any other suitable types of memory.

The set of instructions can include various commands that instruct the map labeling control unit 104 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the map labeling control unit 104. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the map labeling control unit 104 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
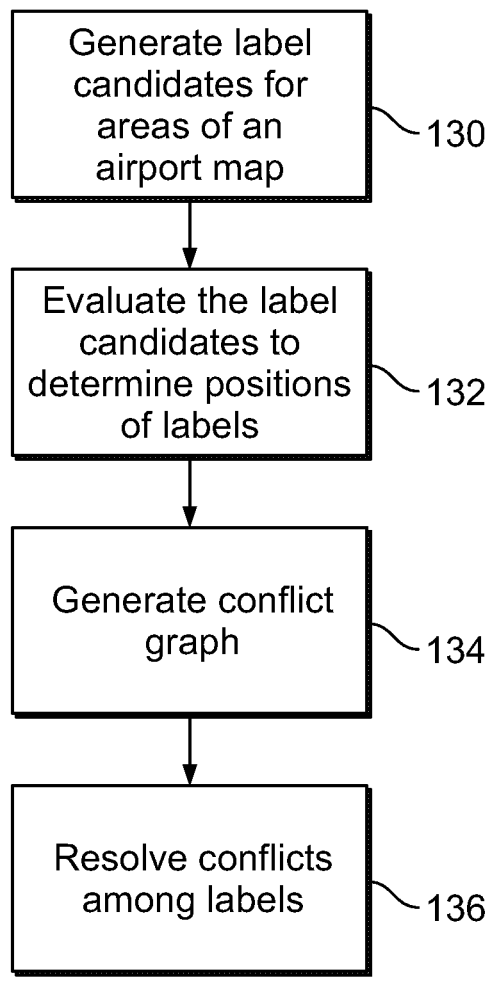
FIG. 3 illustrates a flow chart of a method for labeling areas on an airport map, according to an embodiment of the subject disclosure.

FIG. 3 illustrates a flow chart of a method for labeling areas on an airport map, according to an embodiment of the subject disclosure. In at least one embodiment, the airport map 102 includes data that associates with predetermined labels associated with geometric shapes. For example, a shape corresponding to a terminal is associated with a label for such terminal. The labels and associated shapes can be user-defined, dynamically-defined based on rules stored in memory, predetermined, and stored as data regarding the airport map 102 in the memory 102. In at least one embodiment, referring to FIGS. 1-3, the method can be implemented at least in part by the map labeling control unit 104. At 130, label candidates for areas of an airport map can be generated. At 132, the label candidates can be evaluated, as described herein, to determine positions of labels on the areas. At 134, a conflict graph regarding the labels can be generated. At 136 conflicts among the labels can be resolved.

In at least one embodiment, the areas on the airport map are buildings (such as terminals, a control tower, hangars, and the like) of an airport as represented on the airport map. The map labeling control unit 104 generates label candidates for the buildings on the airport map, and evaluates the label candidates for the buildings, such as to determine positions of the labels for the buildings on the airport map.

In at least one embodiment, the areas on the airport map are taxiways of an airport as represented on the airport map. The map labeling control unit 104 generates label candidates for the taxiways on the airport map, and evaluates the label candidates for the taxiways, such as to determine positions of the labels for the taxiways on the airport map.

In at least one embodiment, the areas on the airport map are deicing locations (such as deicing pads and stands) of an airport as represented on the airport map. The map labeling control unit 104 generates label candidates for the deicing locations on the airport map, and evaluates the label candidates for the deicing locations, such as to determine positions of the labels for the deicing locations on the airport map.

In at least one embodiment, the areas on the airport map are helipads of an airport as represented on the airport map. The map labeling control unit 104 generates label candidates for the helipads on the airport map, and evaluates the label candidates for the helipads, such as to determine positions of the labels for the helipads on the airport map.

In at least one embodiment, the areas on the airport map are parking stands of an airport as represented on the airport map. The map labeling control unit 104 generates label candidates for the parking stands on the airport map, and evaluates the label candidates for the parking stands, such as to determine positions of the labels for the parking stands on the airport map.

In at least one embodiment, the areas on the airport map are aprons of an airport as represented on the airport map. The map labeling control unit 104 generates label candidates for the aprons on the airport map, and evaluates the label candidates for the aprons, such as to determine positions of the labels for the taxiways on the airport map.

Figure 4:
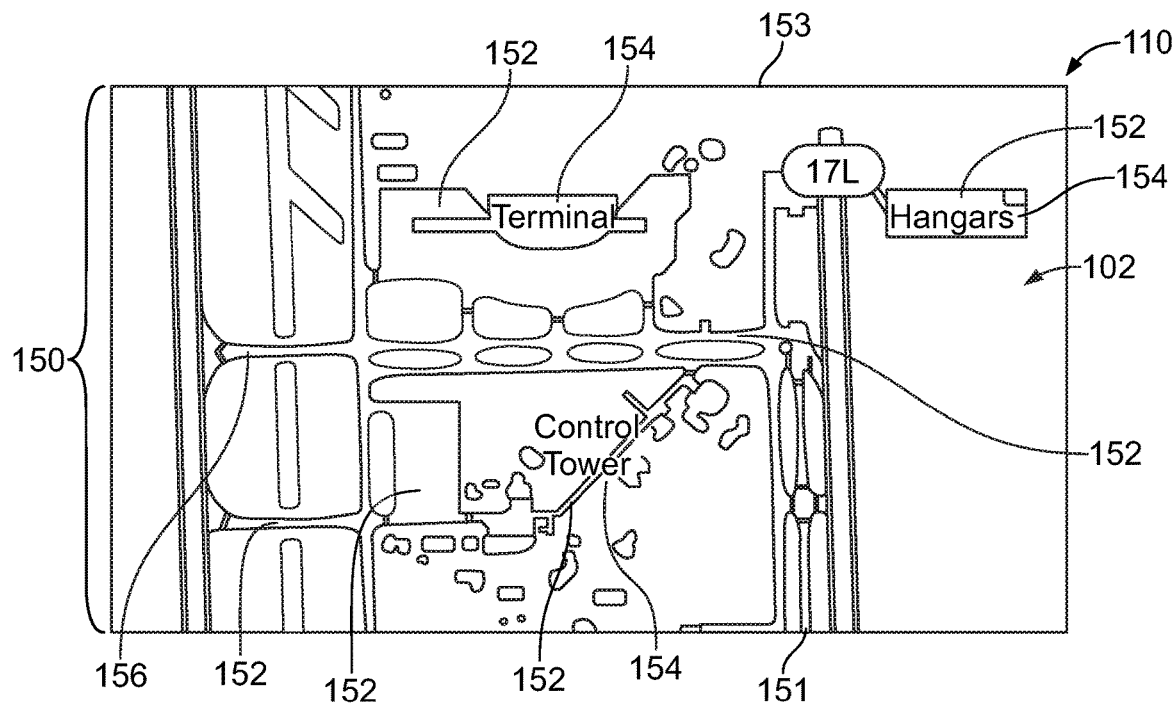
FIG. 4 illustrates a display showing an airport map at a first zoom level, according to an embodiment of the subject disclosure.

FIG. 4 illustrates the display 110 showing an airport map 102 at a first zoom level, according to an embodiment of the subject disclosure. As an example, the first zoom level is a maximum extent zoom level, which includes a vertical scale 150. The vertical scale 150 extends from a bottom 151 to a top 153 of the airport map 102, as shown on the display 110. The vertical scale 150 can be indicative of 5 kilometers (km). For example, the vertical scale 150 is 4.79 km.

The airport map 102 shows a geometric shape 152 of a terminal, and an attribute 154 including a label for the terminal. The airport 102 also shows geometric shapes 152 of a control tower and hangars, and attributes including labels for the control tower and hangars.

Referring to FIGS. 1 and 4, the map labeling control unit 104 shows the overall layout of the airport (as represented by the airport map 102) with labels for only predetermined main areas, such as the terminal, the control tower, and the hangars. The designation of main areas is predetermined and stored as part of the data for the airport map 102, as stored in the memory 106.

All of the areas represented by geometric shapes 152 are subject to labeling. In at least one embodiment, the map labeling control unit 104 prioritizes area labeling with major taxiways as a first priority, a control tower as a second priority that is less than the first priority, terminals, concourses, and piers as a third priority that is less than the second priority, and other areas as a fourth priority that is less than the third priority. Priority rules are stored in the memory 106 or memory 116. The priority rules can be user-defined. Such prioritization is merely exemplary, and the map labeling control unit 104 can reorder prioritization.

In at least one embodiment, a taxiway 156 is considered a major taxiway if its length is greater than 20% of a taxiway, and/or its area is greater than 30% of a largest taxiway. The designation of major and minor taxiways, as well as other areas on the airport map, is predetermined and stored as part of the data for the airport map 102, as stored in the memory 106.

Figure 5:
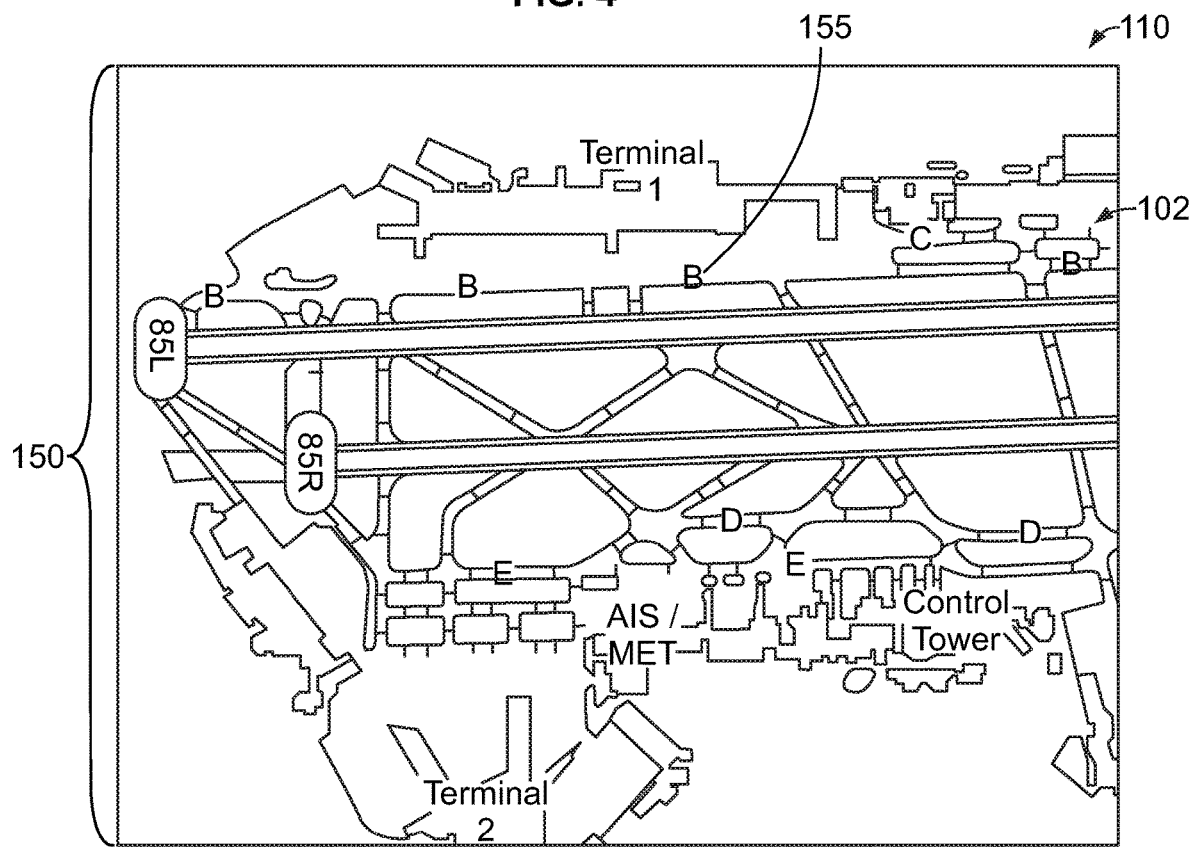
FIG. 5 illustrates a display showing an airport map at a second zoom level, according to an embodiment of the subject disclosure.

FIG. 5 illustrates the display 110 showing an airport map 102 at a second zoom level, according to an embodiment of the subject disclosure. The second zoom level is less than the first zoom level. For example, the vertical scale 150 at the second zoom level is 4 km. In the second zoom level, labels 155 for certain main taxiways are shown, such as main taxiways B, C, D, and E. Referring to FIGS. 1 and 5, at the second zoom level, the map labeling control unit 104 can label main taxiways (such as main taxiways B, D, D, and E), terminals (such as Terminals 1 and 2), the control tower, and runways.

Figure 6:
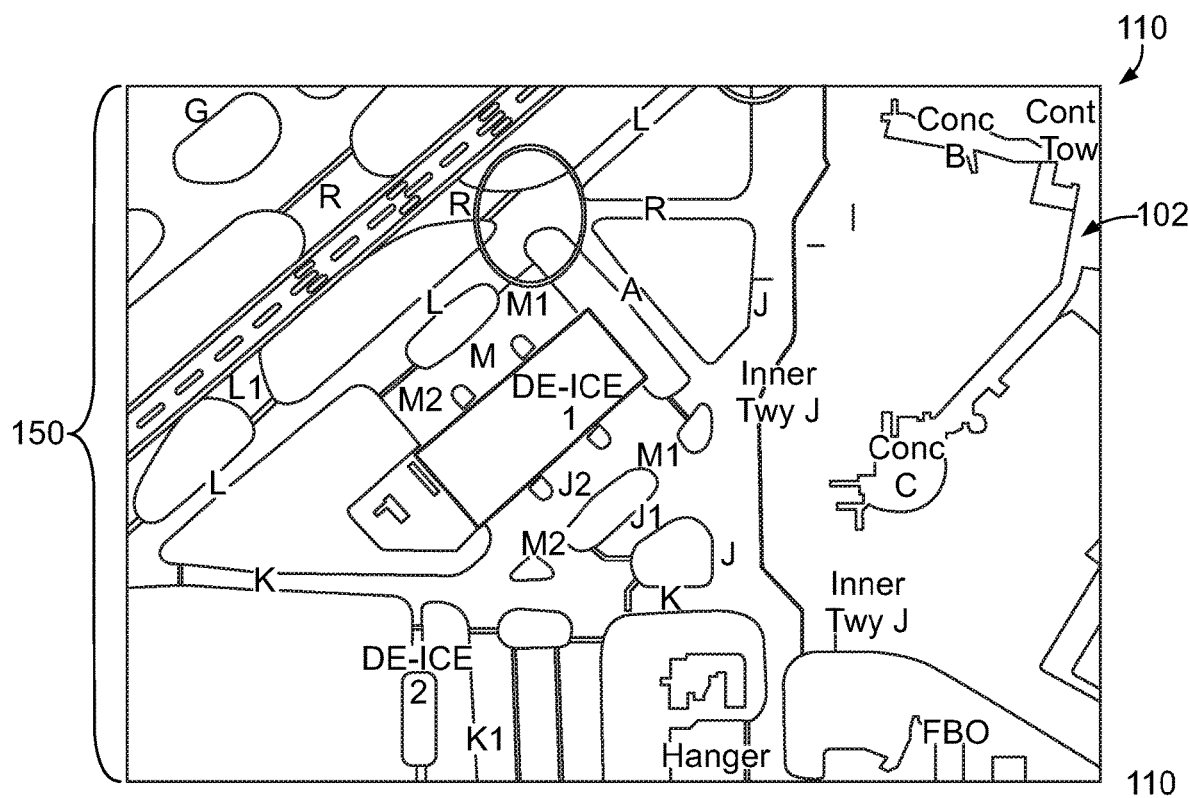
FIG. 6 illustrates a display showing an airport map at a third zoom level, according to an embodiment of the subject disclosure.

FIG. 6 illustrates the display 110 showing an airport map 102 at a third zoom level, according to an embodiment of the subject disclosure. The third zoom level is less than the second zoom level. For example, the vertical scale 150 at the third zoom level is 2 km. In the third zoom level, labels 155 for all taxiways are shown, such as main taxiways J, K, and L, and minor taxiways, such as J2, K1, and M1. Referring to FIGS. 1 and 6, at the third zoom level, the map labeling control unit 104 can label main taxiways, minor taxiways, concourses of terminals, the control tower, deicing areas, and hangars.

Figure 7:
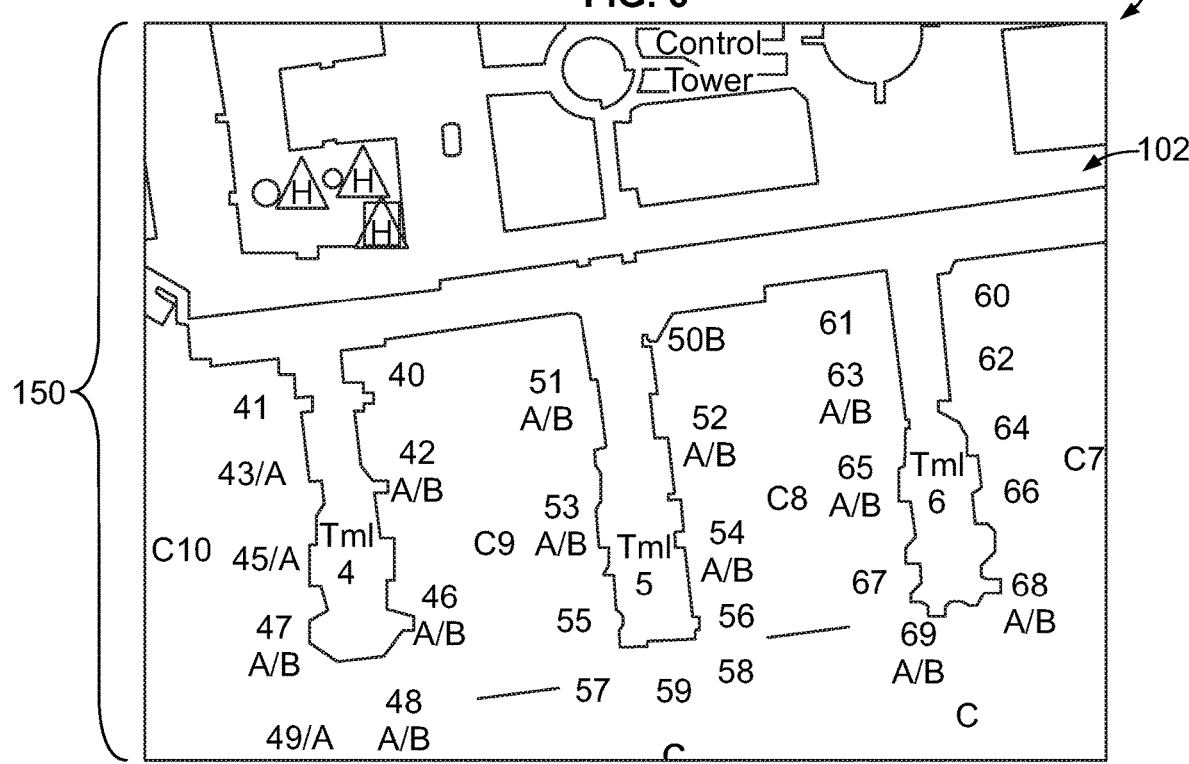
FIG. 7 illustrates a display showing an airport map at a third zoom level, according to an embodiment of the subject disclosure.

FIG. 7 illustrates the display 110 showing an airport map 102 at a fourth zoom level, according to an embodiment of the subject disclosure. The fourth zoom level is less than the third zoom level. For example, the vertical scale 150 at the fourth zoom level is 1 km. In the fourth zoom level, labels parking stands (such as 40, 42, 46, and the like) proximate to gates of a terminal are shown. Referring to FIGS. 1 and 6, at the fourth zoom level, the map labeling control unit 104 can label all parking stands shown on the display 110.

Referring to FIGS. 1 and 4-7, the map labeling control unit 104 determines different sets of labels to display (for example, show on a display) for different views of the airport map 102. In at least one embodiment, the different views are different zoom levels of the airport map. For example, the map labeling control unit 104 provides (for example, shows on the airport map 102) first labels for first areas at the first zoom level, second labels for second areas at the second zoom level, third labels for third areas at the third zoom level, and fourth labels for fourth areas at the fourth zoom level. In at least one embodiment, the first areas at the first zoom level include major buildings, such as one or more terminals, one or hangars, and a control tower (that is, these first areas are labeled at the first zoom level). The second areas at the second zoom level include major taxiways (that is, all shown major taxiways are labeled). The third areas at the third zoom level include all shown taxiways and deicing locations (that is, all taxiways, whether major or not, and deicing locations that are shown are labeled). The fourth areas at the fourth zoom level include all shown parking stands (that is, all parking stands that are shown are labeled).

The map labeling control unit 104 creates complete label sets for a plurality of zoom levels, such as the first zoom level, the second zoom level, the third zoom level, and the fourth zoom level. With respect to the first zoom level, which can be considered the maximum zoom level, the map labeling control unit 104 labels (for example, annotates with text) selected buildings, prioritized as (1) control tower, (2) terminals, concourses, piers, and (3) other large buildings. As an example, a building is considered large if its area is greater than 30% of the area of the largest building that exists in the airport map 102. The priority rules are stored in the memory 106 and/or the memory 116. The priority rules are predefined. For example, a user may define the priority rules. In at least one embodiment, the map labeling control unit 104 determines or selects the sets of labels for different views of the airport map based on various criteria, including defined priorities, user-defined data, and/or the like.

With respect to the second zoom level, all buildings can be subject to labeling. Major taxiways are added at the top of the priority list. For example, at the second zoom level, the map labeling control unit 104 labels areas based on the following priority: (1) major taxiways, (2) control tower, (3) terminals, concourses, and piers, and (4) other buildings.

With respect to the third zoom level, all buildings and all taxiways are subject to labeling. Deicing areas and helipad symbols are added. Non-major taxiways (connectors) have the highest priority in the third zoom level. For example, at the third zoom level, the map labeling control unit 104 labels areas based on the following priority: (1) non-major taxiways, (2) major taxiways, (3) terminals, concourses, piers, (4) deicing locations (such as deicing pads), (5) other buildings, helipads, and (6) control tower.

With respect to the fourth zoom level, all airport features are labeled on this level (highest priority first). For example, at the fourth zoom level, the map labeling control unit 104 labels areas based on the following priority: (1) parking stands, (2) aprons, (3) taxiways (both major and non-major, e.g., minor), (4) terminals, concourses, piers, (5) deicing locations, (6) other buildings, helipads, and (7) control tower.

The map labeling control unit 104 is also programmed to operate according to overlap rules, which are stored in a memory (such as the memory 106 shown in FIG. 1 and/or the memory 116 shown in FIG. 2). The overlap rules include a non-overlap rule, which is defined as labels do not overlap with each other. An example of an exception to the non-overlap rule is that helipad symbols can overlap one other, such as to the extent of a triangular frame around an "H" symbol. That is, the H symbols may not overlap. Next, building and apron labels cannot overlap runway geometries with the exception of control tower shown in at the first zoom level. Further, taxiway labels stay away from runways, deicing areas and taxiway hold lines. "Stay away" is defined as some overlap is allowed when there is no other way to place the label without overlap. In such stay away cases, the overlapping area cannot be more than half the area of the label and the label is placed in such a way so that the overlap is minimal.

Referring again to FIG. 1, the map labeling control unit 104 executes a sequence of steps to create a label set for the airport map 102. Initially, the map labeling control unit 104 retrieves shape data (such as extracted from the airport map 102 stored in the memory 106), then merges service road geometries into other features, the features are then preprocessed (for example, containerized), then each of the available zoom levels for the airport map 102 are labeled, the labels of which can then be written to an annotation file.

In at least one embodiment, the map labeling control unit 104 reads all shape files for the airport map 102 from a designated location (determined by file extension). Shape file attributes and geometry are placed in an airport object. Old anno (that is, annotation) files are deleted before processing begins. All airport maps within a specified source directory can be processed.

Figure 8:
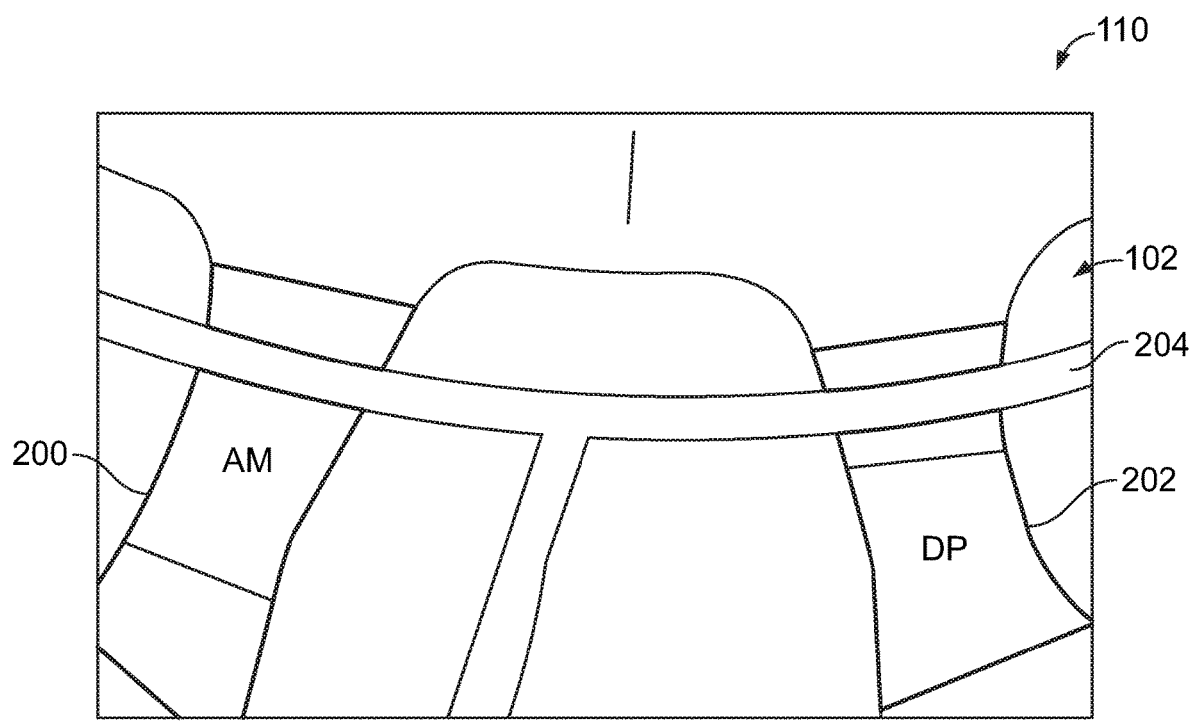
FIG. 8 illustrates a portion of a display showing a portion of an airport map having taxiways intersected by a service road, according to an embodiment of the subject disclosure.

FIG. 8 illustrates a portion of the display 110 showing a portion of an airport map 102 having taxiways intersected by a service road 204, according to an embodiment of the subject disclosure. In at least one embodiment, service roads are not considered for generation of the airport map. However, the service roads can be modeled in such a way that the intersection with other features belongs to the roads. Accordingly, service road sections belonging to other features are combined with the corresponding features. The service roads can then be discarded.

Referring again to FIG. 1, containerization is a process of pre-processing geometrical shapes so that the geometrical shapes are ready for label generation. The pre-processing includes grouping geometries that represent the same airport entity, calculating clusters based on geometric proximity, and generating additional anchor geometries where label candidates are to be placed. In at least one embodiment, containerization is specific for different types of shapes (buildings, taxiways, and the like).

As described above, for each zoom level, different features are labeled following different priorities. The zoom levels are labeled independently. Even though some features can be present on multiple levels, their positions are not considered linked. In at least one embodiment, the results generated by the map labeling control unit 104 are saved in a set of annotation files, which can be normal shape files and complement the representations of shapes of the airport as represented by the airport map 102.

Figure 9:
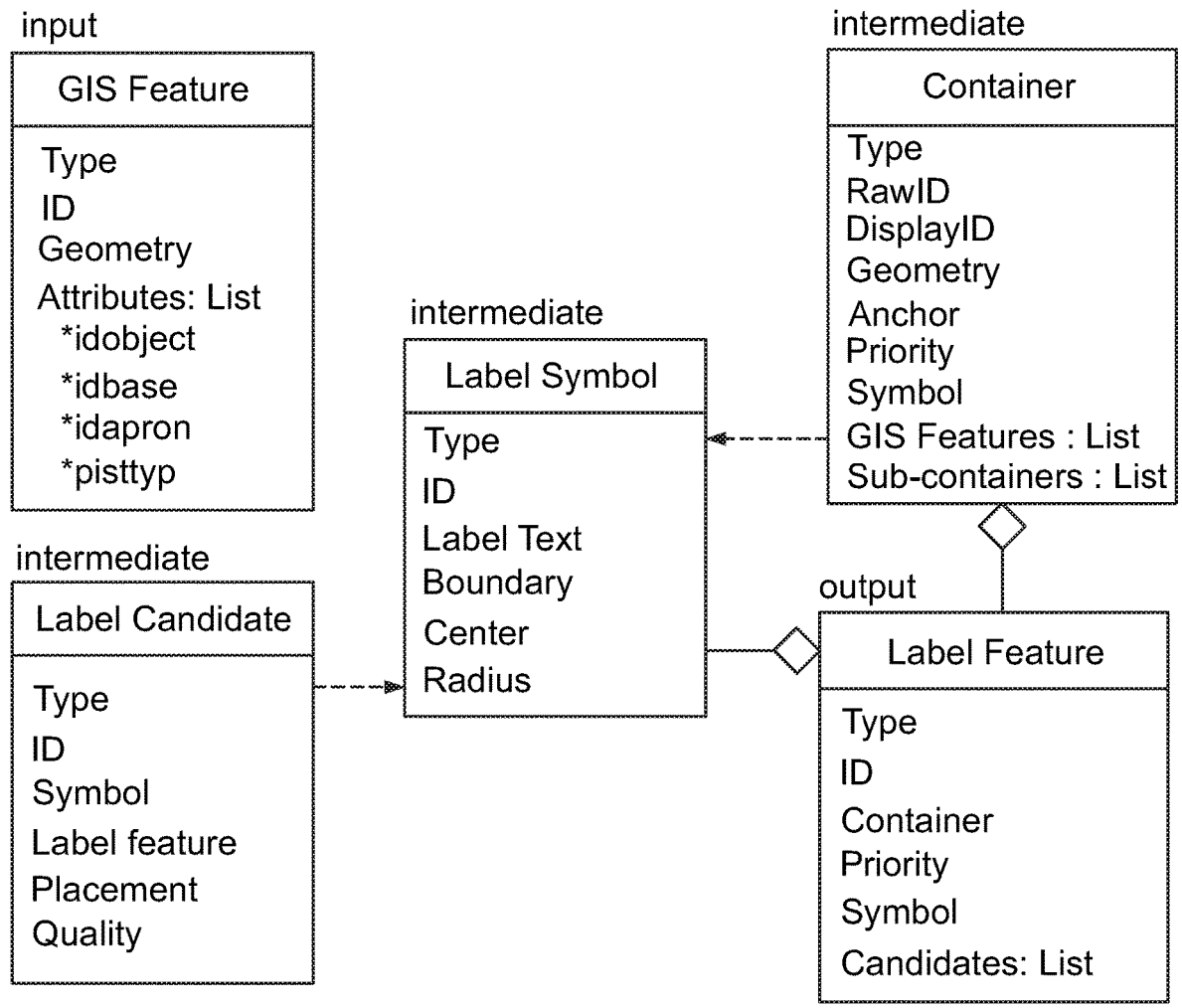
FIG. 9 illustrates a box diagram of data objects as analyzed by a map labeling control unit, according to an embodiment of the subject disclosure.

FIG. 9 illustrates a box diagram of data objects as analyzed by the map labeling control unit 104 (shown in FIG. 1), according to an embodiment of the subject disclosure. The data objects shown in FIG. 9 can be considered main objects that contain input data (such as can be user-defined), intermediate processing results, and a final output of the map labeling control unit 104. In at least one embodiment, the main data objects include a Geographical Information System (GIS) Feature, label symbol, label feature, container, and label candidate.

The GIS feature objects are a direct copy of the features stored in the shape files for the airport. Each feature can have a type, a unique ID, geometry and attributes. The map labeling control unit 104 uses the idobject, idbase, and idapron attributes. Additionally, for building labels, the "plsttyp" attribute is used to determine the type of the building.

The Container object can include a number of features, or a number of other containers, but not both. Whether the container is a feature container or a "container container" is determined by its type.

The rawID is the identifier coming from the "idobject" attribute of the feature (for example, all features in one container have the same "idobject" attribute). This attribute determines the label text which is rendered on the screen. It can be abbreviated, split into two lines or represent a combination of containers. It can also be replaced by a uniform symbol—like DE-ICE, for all deicing features, regardless of their names.

The geometry field is either the combined geometry of all the features in the container, or the combined geometry of the sub-container geometries.

The anchor geometry is the geometry used to place label candidates. It is polygonal for buildings, aprons and de-icing areas, and linear for taxiways and groups of parking stands.

The priority field is set according to requirements, such as can be user-defined. It is based on feature type and/or zoom level.

Container also has a reference to label symbol when calculations based on the label text geometry are necessary.

The label symbol represents a text of a label. It has a type, ID and label text fields, as well as geometry fields to be used for overlap calculations—boundary (circular), center, and radius.

The label feature object corresponds to one placed label. It references a label symbol object and contains a list of label candidates, one of which eventually gets placed. In some cases, there can be multiple label features per container, for example taxiways.

Every label feature has a priority that is utilized to determine which label will be kept in case of a lack of space. The priority is determined by feature type and/or zoom level.

The label candidate contains references to the label feature it is part of, and its label symbol. It also carries a "placement" field—the coordinates of the candidate position, and "quality," which is determined during a candidate evaluation.

Zoom level labeling includes generating label candidates, which is the process of generating label features and label candidate sets for these features. That is, the map labeling control unit 104 generates label candidates. The generation rules are different for different features and/or different zoom levels.

Next, the map labeling control unit 104 evaluates label candidates, which is the process of assigning quality tags to the set of generated candidates. The evaluation is different for different features and different zoom levels.

Next, the map labeling control unit 104 constructs a conflict graph, which is a base for deconfliction. The conflict graph is not dependent on the feature type, except for abbreviated building labels.

In at least one embodiment, the map labeling control unit 104 selects a candidate for every feature, thereby eliminating other candidates. At each round, one or two features are labeled. If not possible, the map labeling control unit 104 eliminates a candidate with too many conflicts, restarts, and stops when all candidates are either placed or eliminated.

The map labeling control unit 104 labels areas of the airport shown on the airport map 102. Different sets of airport features are labeled on different zoom levels with labeling rules. In at least one embodiment, certain buildings are labeled on all levels. On the first zoom level (such as shown in FIG. 4), only selected buildings are labeled.

Building containers consist of polygonal shapes grouped on the basis of the "idobject" attribute and the shape type. Generally, polygons that share a boundary are included in the same container. If the geometries are disjointed, there can be multiple containers with the same name. Terminals, concourses, and piers are exceptions in that they can combine disjointed polygons.

Figure 10:
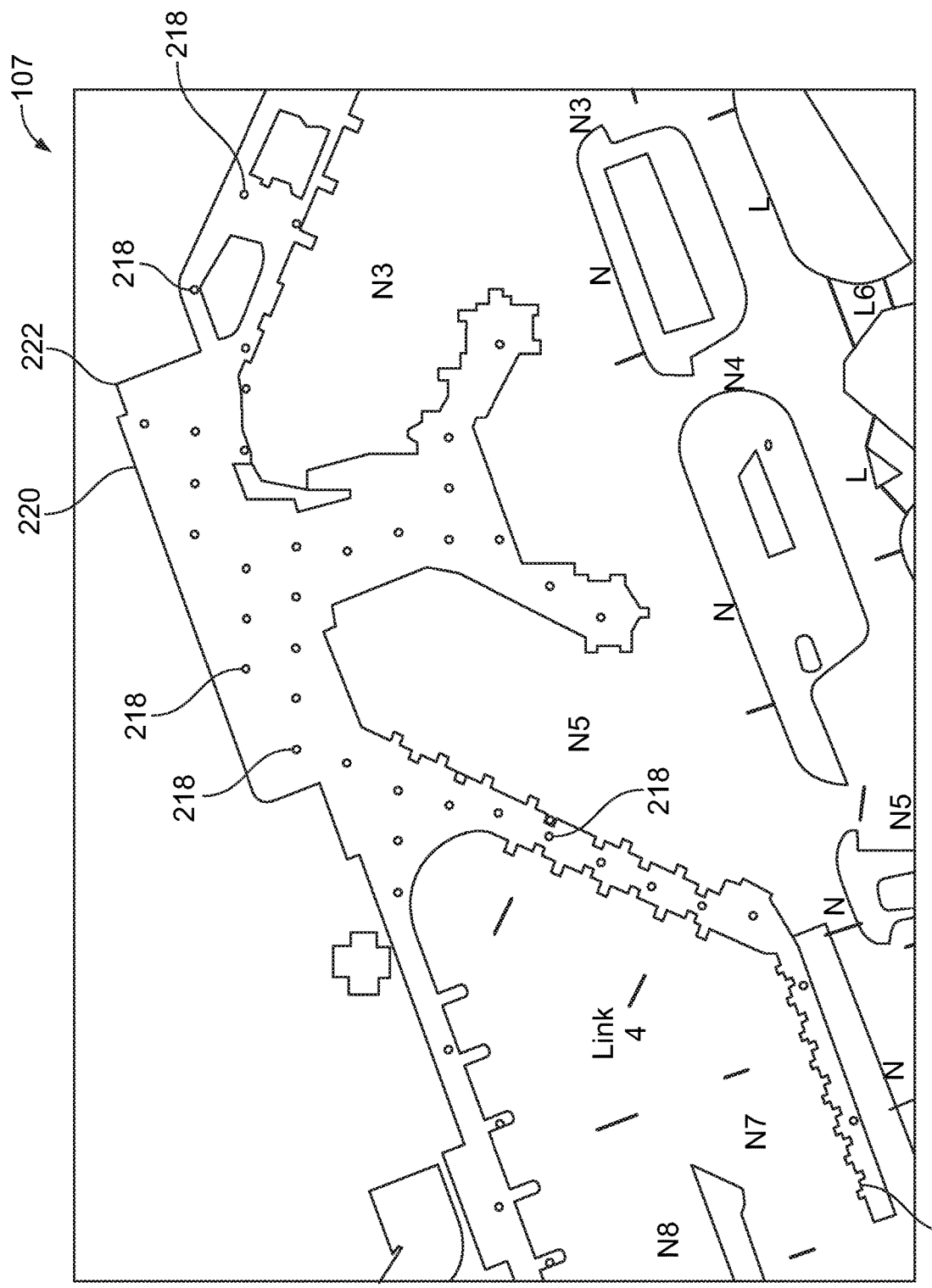
FIG. 10 illustrates a portion of an airport map showing label candidates for an area, according to an embodiment of the subject disclosure.

FIG. 10 illustrates a portion of an airport map 102 showing label candidates 218 for an area 220, according to an embodiment of the subject disclosure. In this example, the area 220 is a terminal at the third zoom level. Referring to FIGS. 1 and 10, examples of areas on the airport map 102 are buildings (for example, representations of terminals, a control tower, hangars, and the like of the airport). The map labeling control unit 104 generates label candidates for the buildings on the airport map 102, and evaluates the label candidates for the buildings, such as to determine positions of the labels for the buildings on the airport map 102.

For example, the map labeling control unit 104 generates building labels as follows. First, the map labeling control unit 104 creates one candidate in a center of the area 220, such as a building geometry. Next, a series of horizontal lines are generated equidistantly from the center point to a highest boundary 222 and a lowest boundary 224 of the building geometry. For each such line, an intersection with the building geometry is calculated, resulting in a series of line segments. Then, the map labeling control unit 104 takes a middle point of each segment as a candidate. If a length of the segment is above a predetermined constant, more points are added equidistantly along the intersecting segment, as long as they stay inside the geometry of the building. Such an approach ensures efficient coverage of the building geometry with a minimum number of candidates placed in symmetric locations. The major buildings in most airports (terminals, concourses, piers) have highly irregular shapes and a simple grid approach leads to either insufficient candidate coverage or, conversely, candidate overload. Accordingly, embodiments of the subject disclosure ensure that each candidate is inside the polygon.

Next, the map labeling control unit 104 evaluates the candidates for building labels. In at least one aspect, the label candidates 218 are assigned a number ranging from 0 to 1000, referred to as quality or quality metric. The higher the quality, the more desirable the candidate. The map labeling control unit 104 determines a quality metric for each the label candidates 218, such as based on the following. First, the map labeling control unit 104 sets the label candidates quality to the feature priority. Next, if a building label candidate intersects with a runway, the quality is set to zero, which does not apply to Control Towers. Next, if a building label candidate's center is outside a building polygon(s), its quality is set to zero, which does not apply to control towers. Next, a label candidate's quality is increased proportionally to a distance to the building's geometry boundary, thus rewarding candidates positioned on a wider section of a building polygon. Next, adjusted quality is decreased proportionally to the distance to the center of the building geometry. If there are more than a certain number of candidates left for this feature (N), only the best N are left, the others are dropped.

Figure 12:
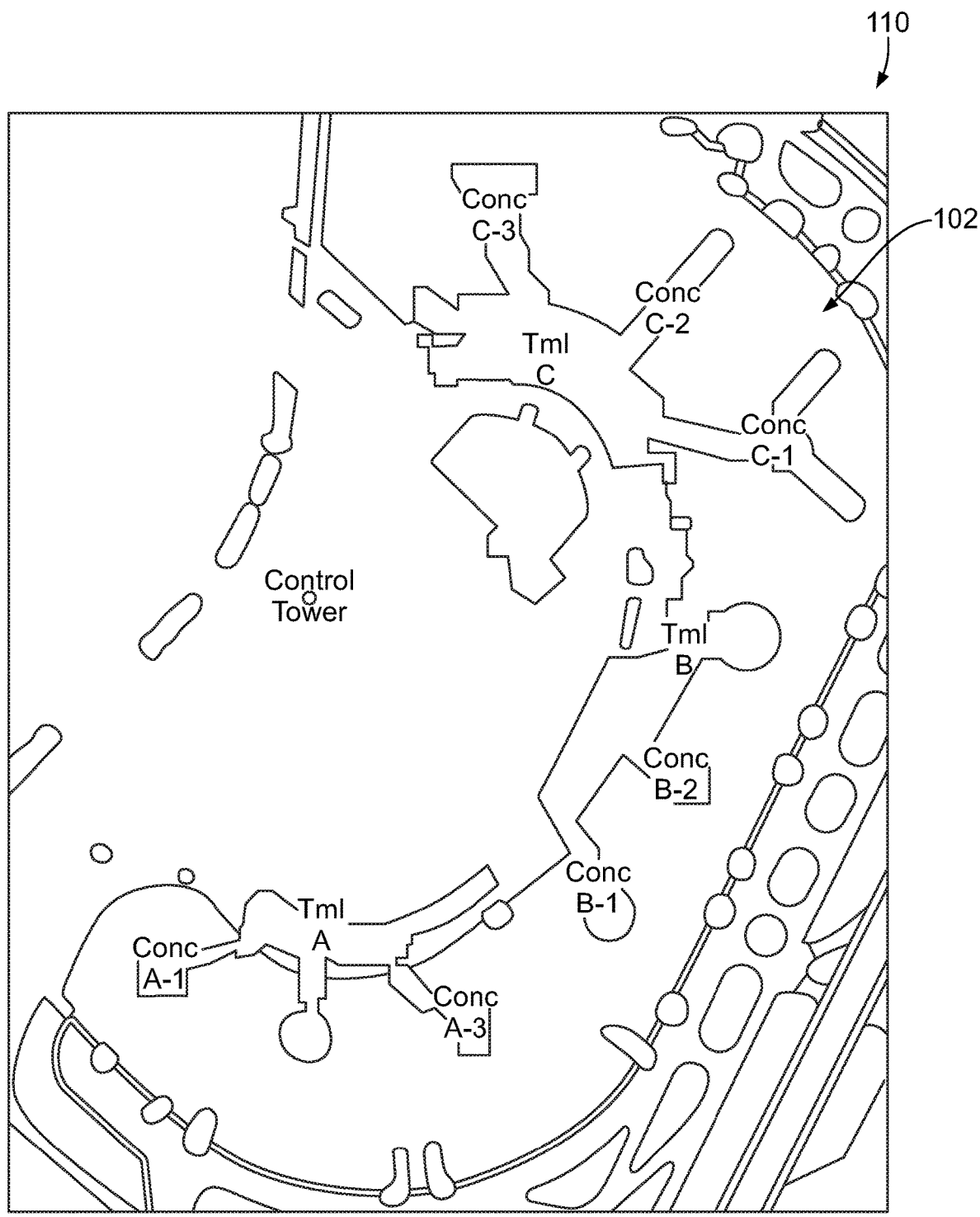
FIG. 12 illustrates a portion of an airport map shown on a display, according to an embodiment of the subject disclosure.

FIG. 11 illustrates an abbreviation chart for buildings of an airport, according to an embodiment of the subject disclosure. FIG. 12 illustrates a portion of an airport map 102 shown on the display 110, according to an embodiment of the subject disclosure. Referring to FIGS. 11 and 12, certain building labels are allowed to be abbreviated if the full label cannot be placed. This is accomplished by adding another set of candidates to the building label feature. They are in the same candidate locations, but with lower priority and the label text is abbreviated. They are evaluated in the same way as the full candidates. Once all the label candidates are generated and evaluated, the building label feature is added to the global feature list, which will then be deconflicted. If two or more buildings of the same type can be seen on the screen at the same time, they can be abbreviated together. That is, if one gets abbreviated, the others are abbreviated as well.

Figure 13:
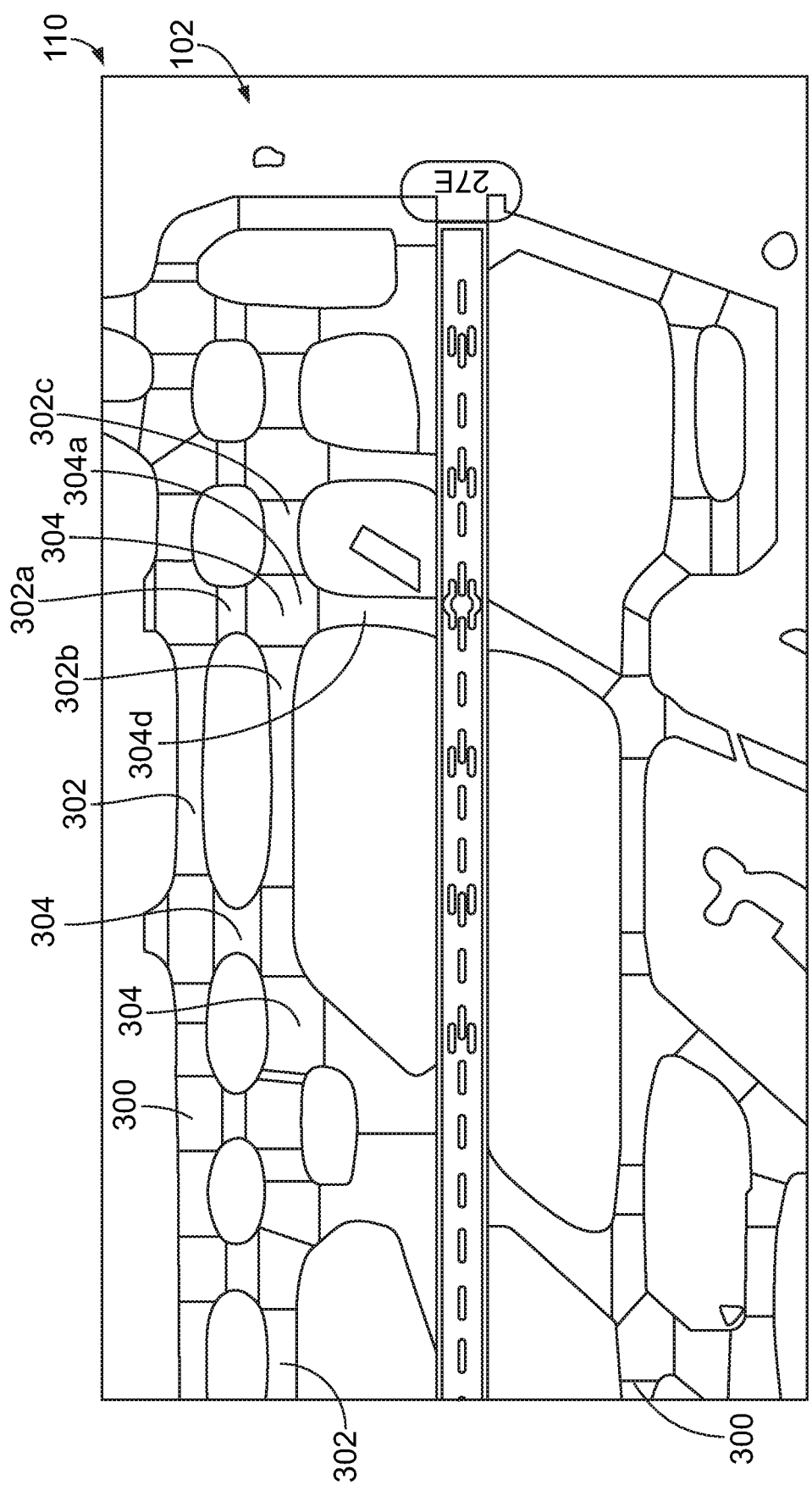
FIG. 13 illustrates taxiways on an airport map shown on a display, according to an embodiment of the subject disclosure.

FIG. 13 illustrates taxiways 300 on an airport map 102 shown on the display 110, according to an embodiment of the subject disclosure. Like buildings, the taxiways 300 are areas on the airport map 102. The taxiways 300 are segmented into polygonal elements 302. For example, the map labeling control unit 104 segments each of the taxiways 300 into a plurality of polygonal elements 302.

Referring to FIGS. 1 and 13, unlike labels for building, labels for taxiway are placed in a linear fashion, such as on a center line (for example, an anchor line) of the taxiway. In at least one embodiment, the map labeling control unit 104 uses the polygonal elements 302 of the taxiways 300 to calculate anchor lines.

In at least one embodiment, containerization for the taxiways 300 is based on the idobject attribute of the polygonal elements 302, and their proximity. If two polygon elements 302 are more than 100 meters (m) apart (as per the scale of the airport map 102) with no intermediate polygon elements with the same idobject attribute, they are placed in separate taxiway containers even if they have the same name.

As shown, taxiways 300 can intersect with one another. For example, as shown in FIG. 13, various intersection elements 304 are shown. The map labeling control unit 104 refrains from positioning a label at any of the intersection elements 304. In at least one embodiment, the map labeling control unit 104 assigns each intersection element 304 to only to one of the intersecting taxiways (such as the larger of the two intersection taxiways). In order to be correctly identified, all of the polygonal elements 302, including the intersection elements 304, are analyzed by the map labeling control unit 104 to determine a set of neighboring polygonal elements 302.

An intersection element 304 of a taxiway is defined as having at least three neighboring polygonal elements, in which at least one of them has the same name as a segment, and at least one of them has a different name than the segment. For example, intersection element 304a is bounded by four (that is, at least three) neighboring polygonal elements 304a, 304b, 304c, and 304d.

Figure 14:
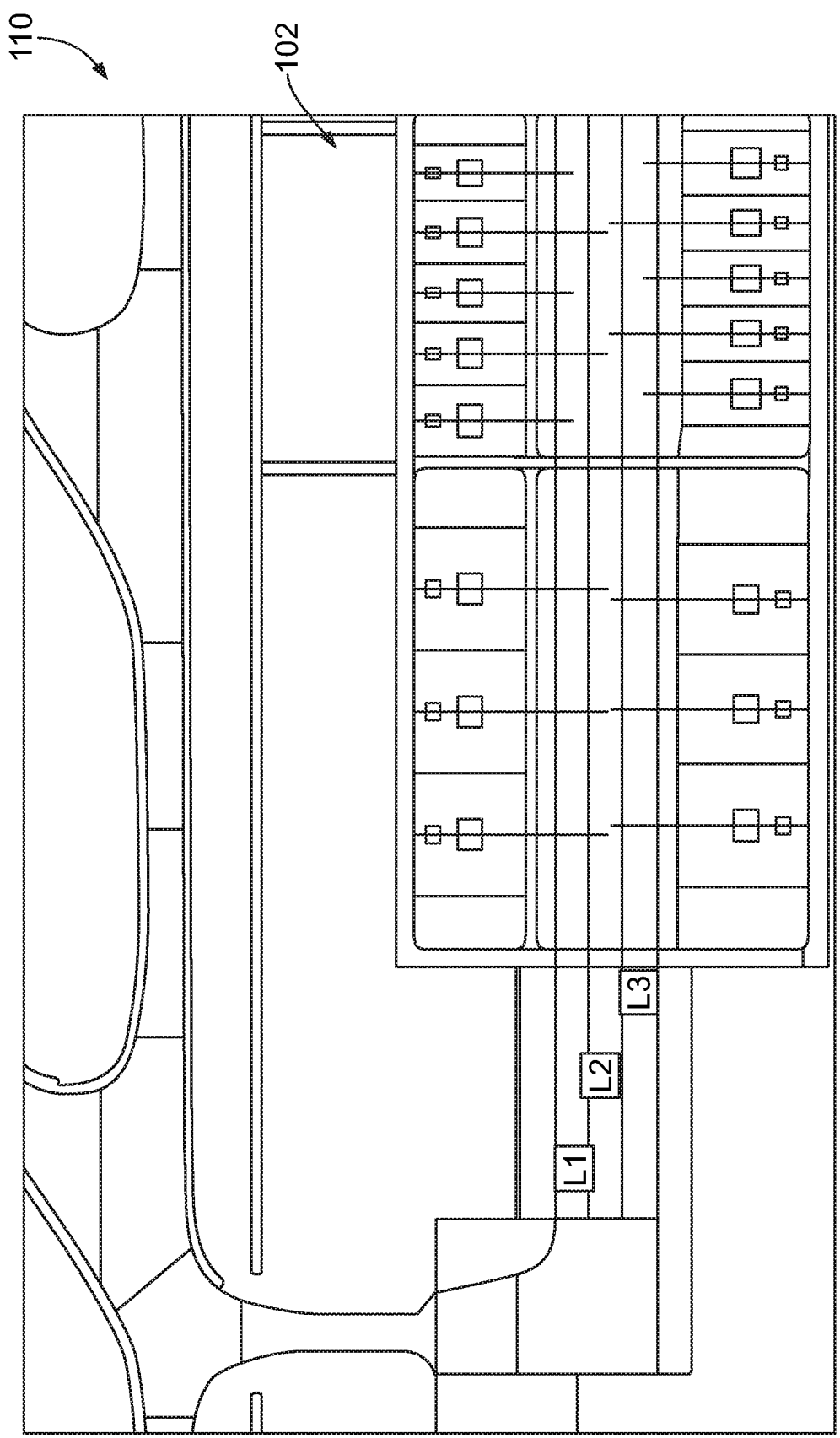
FIG. 14 illustrates taxiways on an airport map shown on a display, according to an embodiment of the subject disclosure.

FIG. 14 illustrates taxiways L1, L2, and L3 on an airport map 102 shown on the display 110, according to an embodiment of the subject disclosure. As shown in FIG. 14, there are certain situations in which a single contiguous lane is split into multiple taxiways (such as the taxiways L1, L2, and L3) along its length. In scenarios such as shown in FIG. 14, the map labeling control unit 104 (shown in FIG. 1) analyzes the taxiways L1, L2, and L3 through an airport-based attribute in a configuration file. In particular, the configuration file can provide instructions indicating that L1, L2, and L3 are taxiways that can be labeled. The instructions ensure that the map labeling control unit 104 does not consider L1 and L2 as neighbors, nor L2 and L3 as neighbors. In essence, the instruction adds an artificial median between L1 and L2, and L2 and L3.

Figure 15:
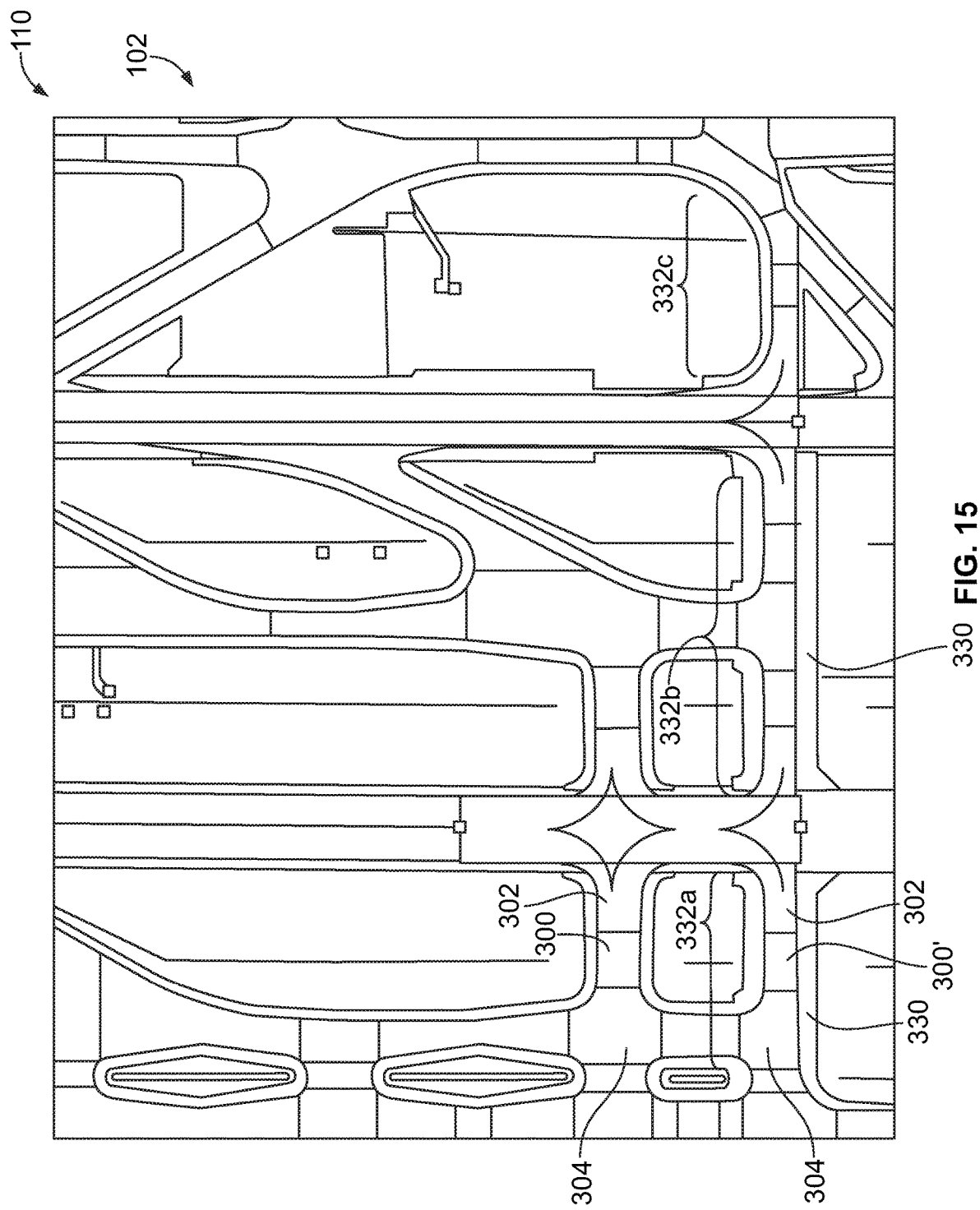
FIG. 15 illustrates taxiways on an airport map shown on a display, according to an embodiment of the subject disclosure.

FIG. 15 illustrates taxiways 300 on an airport map 102 shown on the display 110, according to an embodiment of the subject disclosure. Referring to FIGS. 1 and 15, after the map labeling control unit 104 identifies the intersection elements 304, the map labeling control unit 104 determines taxiway section and segments as follows. First, each intersection element 304 is added to the containers of all neighboring taxiway polygons. Next, an expanded set of geometries is divided into contiguous sections 330. The taxiway container is then split into multiple containers, one for each section. The single taxiway 300' is shown divided into three sections 332a, 332b, and 332c. After the grouping is completed, the map labeling control unit 104 can position labels for the taxiway 300' on centerlines of the remaining polygonal elements, which are called taxiway segments. For example, the sections 332a, 332b, and 332c can be taxiway segments.

Next, the map labeling control unit 104 generates anchor lines. The map labeling control unit 104 generates anchor line by using the taxiway segments. Not every segment will be labeled. Some segments can have multiple labels. Each section 332a, 332b, and 332c is to have at least one label.

The map labeling control unit 104 determines which segment of each section will be labeled and with how many labels will be placed on it, at a candidate generation phase, which can differ for different zoom levels. In the candidate generation phase, the map labeling control unit 104 supplies all taxiway segments with an anchor line, which will be the basis for candidate generation. The map labeling control unit 104 then operates according to straight polygon skeletonizing.

Figure 16:
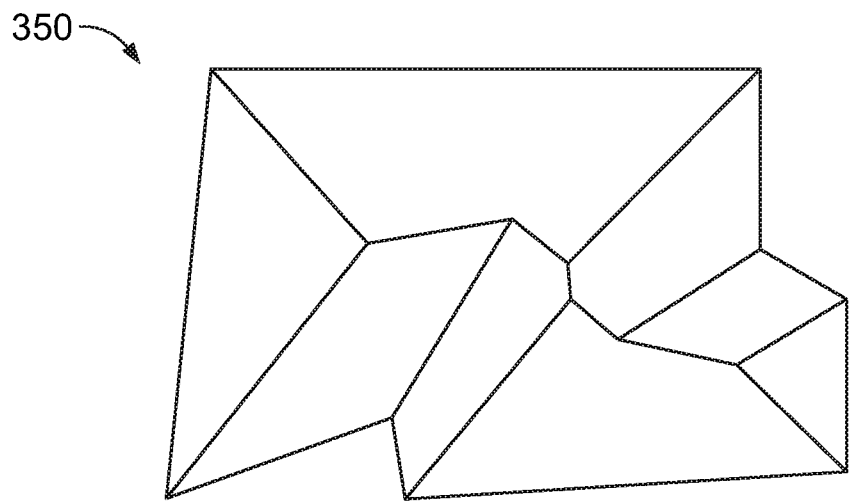
FIG. 16 illustrates a straight polygon skeleton, according to an embodiment of the subject disclosure.
Figure 17:
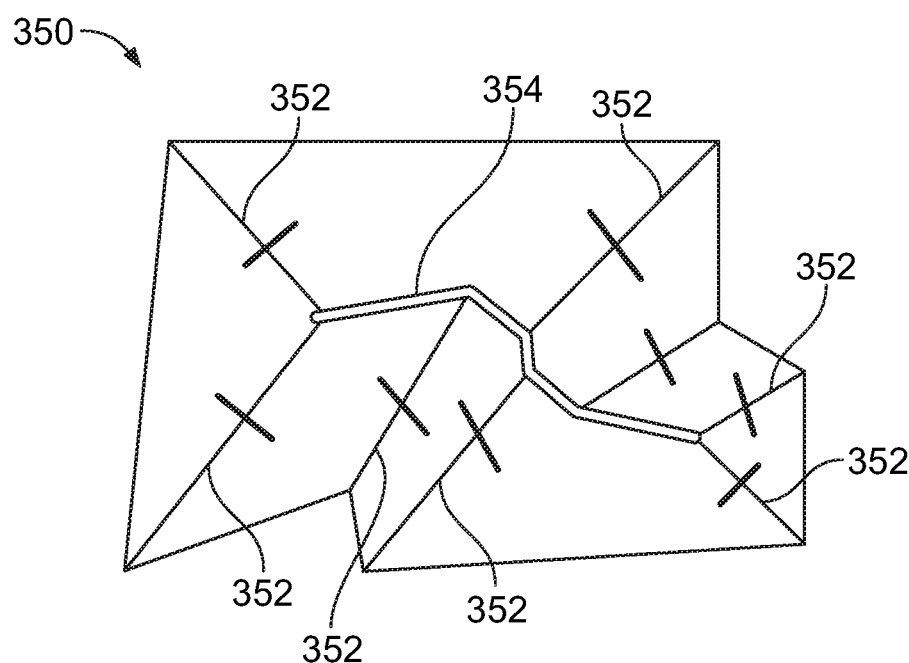
FIG. 17 illustrates the straight polygon skeleton with removed unnecessary line segments.

FIG. 16 illustrates a straight polygon skeleton 350, according to an embodiment of the subject disclosure. FIG. 17 illustrates the straight polygon skeleton 350 with removed unnecessary line segments 352. A polygon skeleton is the set of points (approximated as a poly line) equidistant to the two sides of the polygon, which are closest to the point. House roofs are generally designed using straight skeletonizing.

Referring to FIGS. 1, and 15-17, the map labeling control unit 104 generates the straight polygon skeletons 350 for the taxiway segments. The map labeling control unit 104 removes the unnecessary line segments 352, which are defined as the line segments that connect to an outer edge of the polygon skeleton 350. A skeleton line 354 (for example, an anchoring line) is parallel to a longer direction of the polygon skeleton 350. If the longer side is perpendicular to the taxiway (as in small connectors), the skeleton is unusable, and is replaced by a single point. The criterion for this simplification is the size of the polygon and the difference between its X and Y dimensions. If a calculated anchor point is outside a polygon of the taxiway, the map labeling control unit 104 brings the anchor point inside the polygon, such as by creating vectors from the center point to each of the polygon vertices, summing up the vectors, and determining that the middle point of the intersection of the resulting vector and the polygon is taken as an anchor point. As such, the map labeling control unit 104 ensures that every segment of every taxiway has an anchor line or point, where the labels can be positioned.

Figure 18:
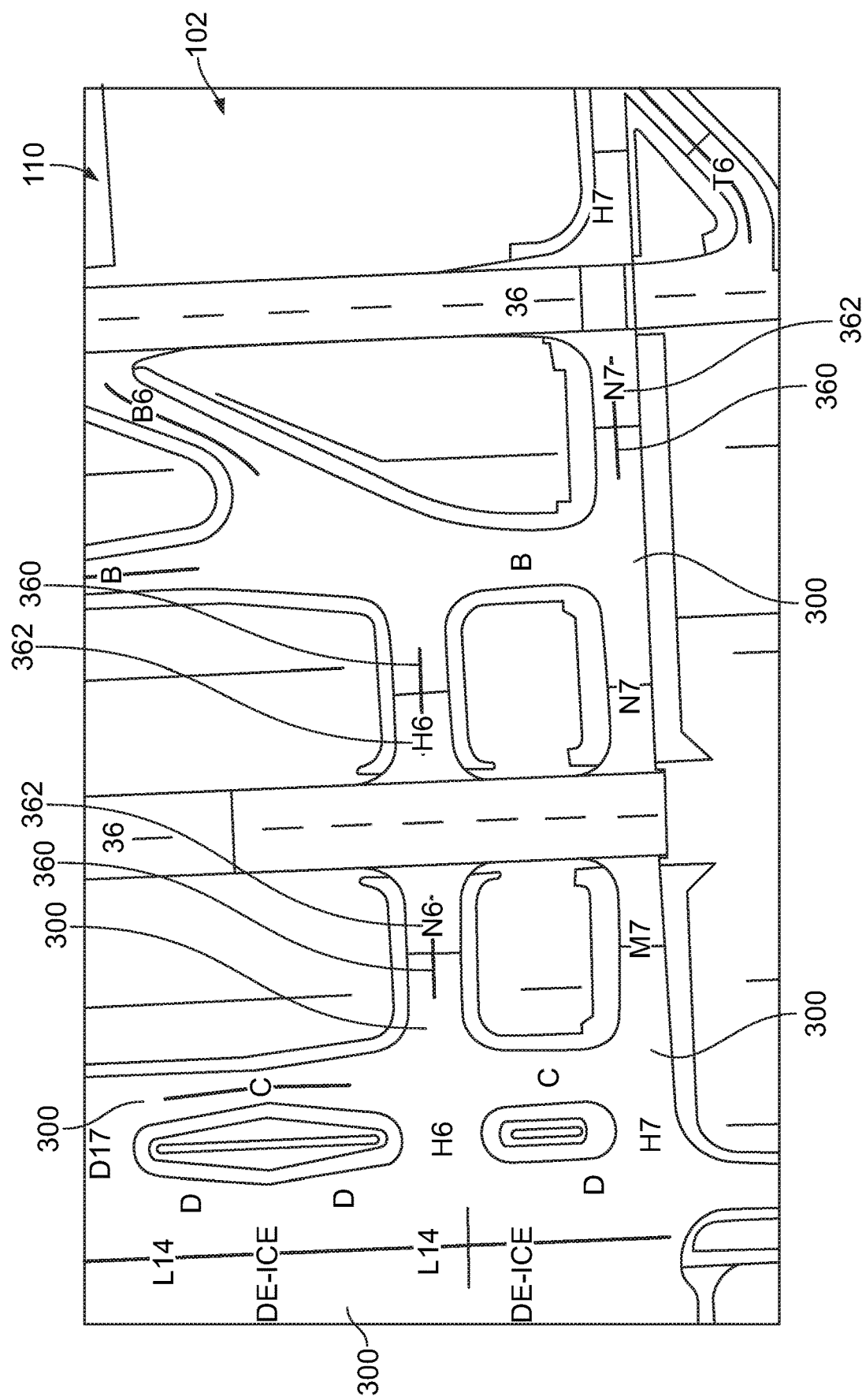
FIG. 18 illustrates an airport map shown on a display, according to an embodiment of the subject disclosure.

FIG. 18 illustrates an airport map 102 shown on the display 110, according to an embodiment of the subject disclosure. As shown in FIG. 18, anchor lines 360 for labels 362 are shown on taxiways 300. The map labeling control unit 104 (shown in FIG. 1) determines the anchor lines 360 and positions the labels 362 thereon.

Referring again to FIG. 1, in at least one embodiment, the areas on the airport map 102 are taxiways of an airport as represented on the airport map. The map labeling control unit 104 generates label candidates for the taxiways on the airport map, and evaluates the label candidates for the taxiways, such as to determine positions of the labels for the taxiways on the airport map.

For example, the map labeling control unit 104 generates taxiway label candidates. Taxiway label candidate generation is performed by sections (i.e., via taxiway containers). In particular, the map labeling control unit 104 determines which segments of the taxiway section will be labeled for each level. Such determination is based on configurable parameters (for each zoom level) for a maximum desired distance between two labels. For each such segment, the map labeling control unit 104 determines how many labels should be placed on the segments to be labeled. The same parameter(s) is used to determine a density of taxiway labels. If more than one label is to be positioned, the anchor line is broken into segment pieces. For each segment piece, labels are positioned equidistantly along the anchor line. In at least one embodiment, the map labeling control unit 104 can be programmed to determine the label candidates through a predetermined desired distance between two taxiway labels. The distance is selected such that at least three labels are placed on a taxiway that crosses the display 110. The distance is different for different zoom levels.

Next, the map labeling control unit 104 evaluates the label candidates for the taxiways, such as by segmenting pieces. In at least one embodiment, the map labeling control unit 104 performs the evaluating by determining a quality metric for each of the label candidates. As an example, the map labeling control unit 104 sets candidate quality to taxiway feature priority. If a candidate center is outside the taxiway geometry, it is discarded. The map labeling control unit 104 proportionately decreased quality of candidates away from the midpoint of the anchor line to the distance to the midpoint. If a candidate overlaps with a runway, its quality is decreased inversely proportionate to the distance to the runway. The map labeling control unit 104 performs the same operations for taxiway position markings and taxiway areas. As such, candidates without intersection are not penalized. Rather, the quality of such candidates depends on the distance to the midpoint, which leads to higher quality labeling.

Figure 19:
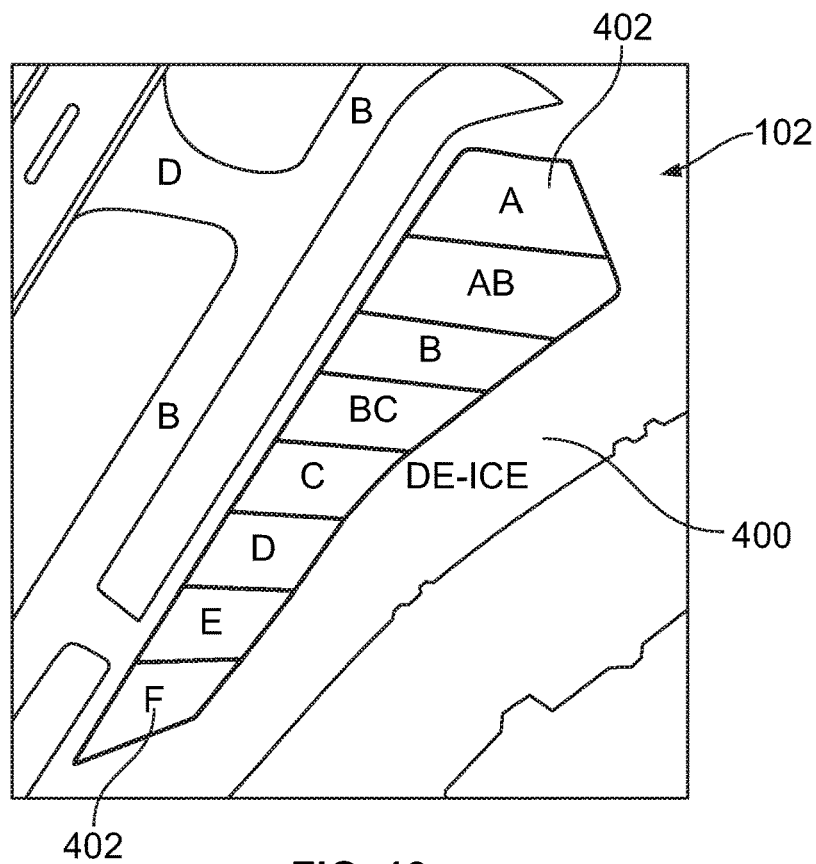
FIG. 19 illustrates a de-icing area on an airport map, according to an embodiment of the subject disclosure.

FIG. 19 illustrates a de-icing area 400 on an airport map 102, according to an embodiment of the subject disclosure. The de-icing area 400 can include a plurality of de-icing stands 402.

Figure 20:
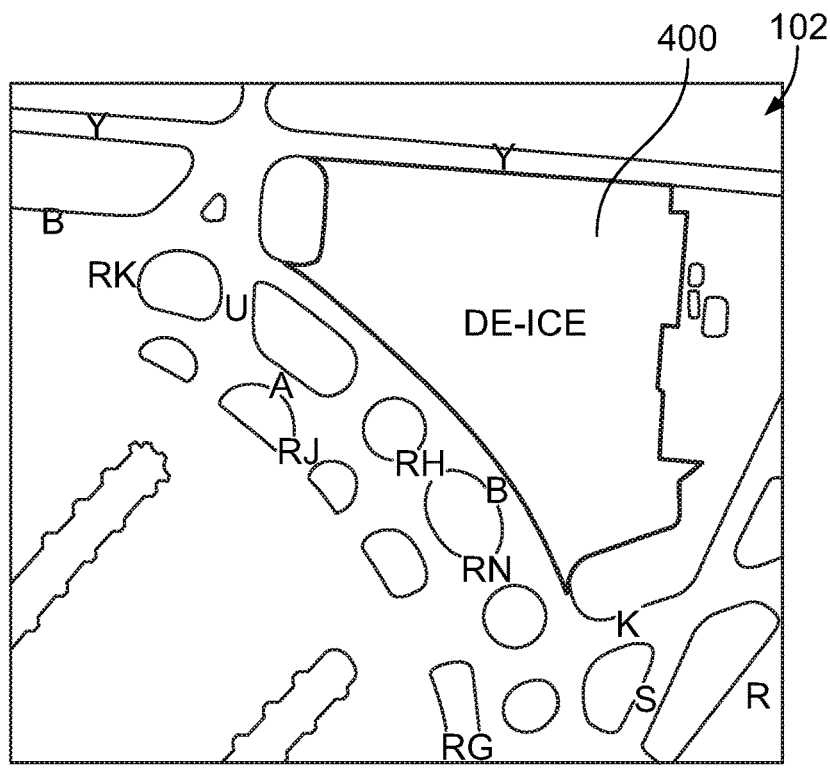
FIG. 20 illustrates a de-icing area on an airport map, according to an embodiment of the subject disclosure.

FIG. 20 illustrates a de-icing area 400 on an airport map 102, according to an embodiment of the subject disclosure. The de-icing area 400 shown in FIG. 20 does not include distinct de-icing stands.

Figure 21:
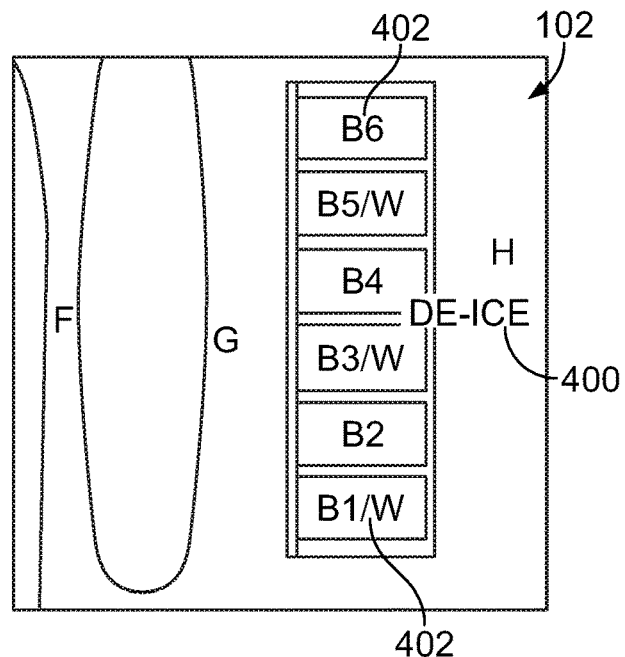
FIG. 21 illustrates a de-icing area on an airport map, according to an embodiment of the subject disclosure.

FIG. 21 illustrates a de-icing area 400 on an airport map, 102 according to an embodiment of the subject disclosure. The de-icing area 400 shown in FIG. 21 includes de-icing stands.

The de-icing areas 400 shown in FIGS. 19-21 are merely exemplary. The de-icing areas 400 can be sized and shaped differently.

Referring to FIGS. 1, and 19-21, the map labeling control unit 104 is also configured to label de-icing areas, such as the de-icing area 400, on the airport map 102. In at least one embodiment, the map labeling control unit 104 labels the de-icing areas with the text (that is, attribute) "DE-ICE." The map labeling control unit 104 labels the de-icing areas at the fourth zoom level (for example, a 1 km zoom level) with a qualifying text as label text.

Figure 22:
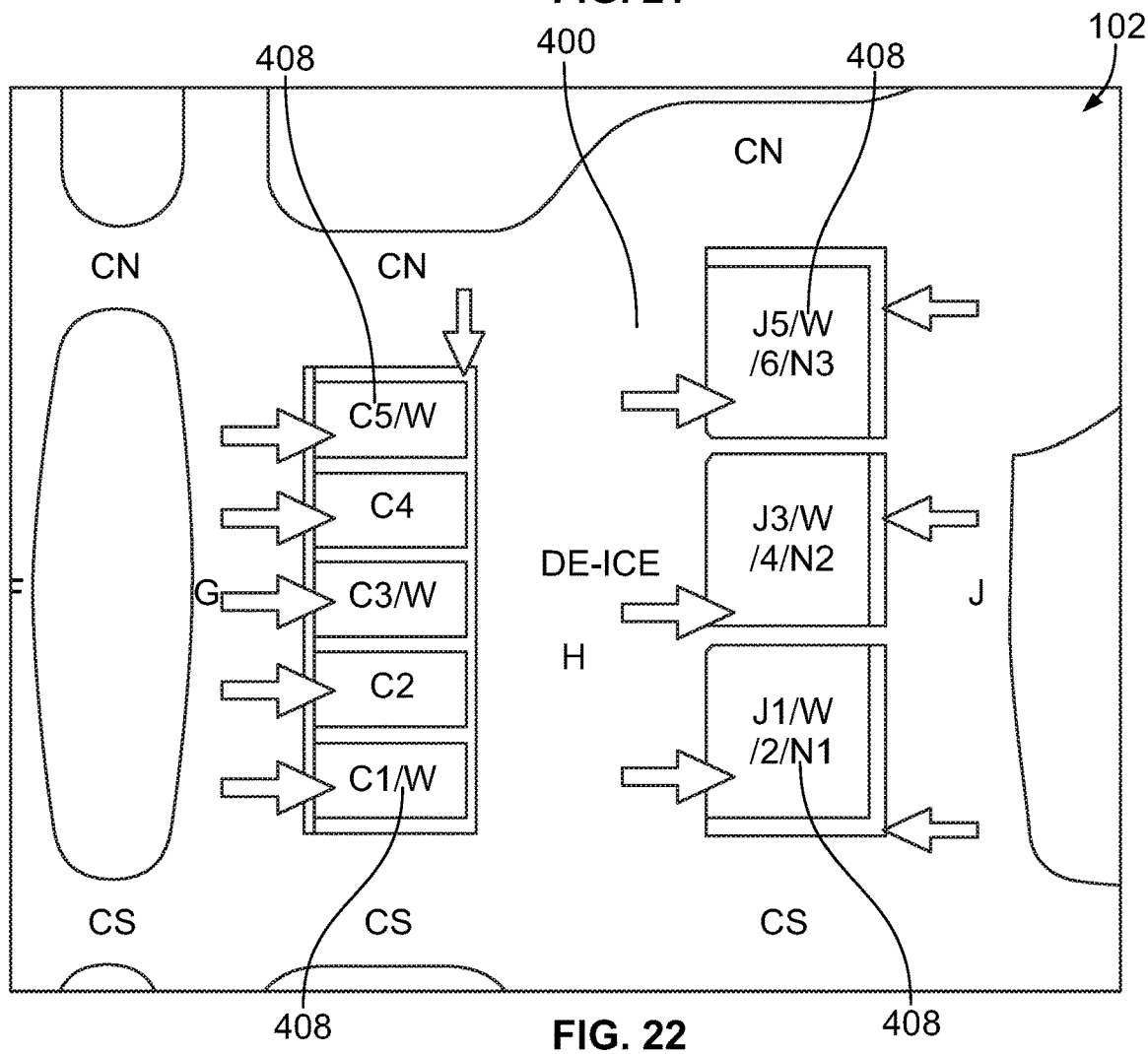
FIG. 22 illustrates de-icing stands on an airport map, according to an embodiment of the subject disclosure.
Figure 23:
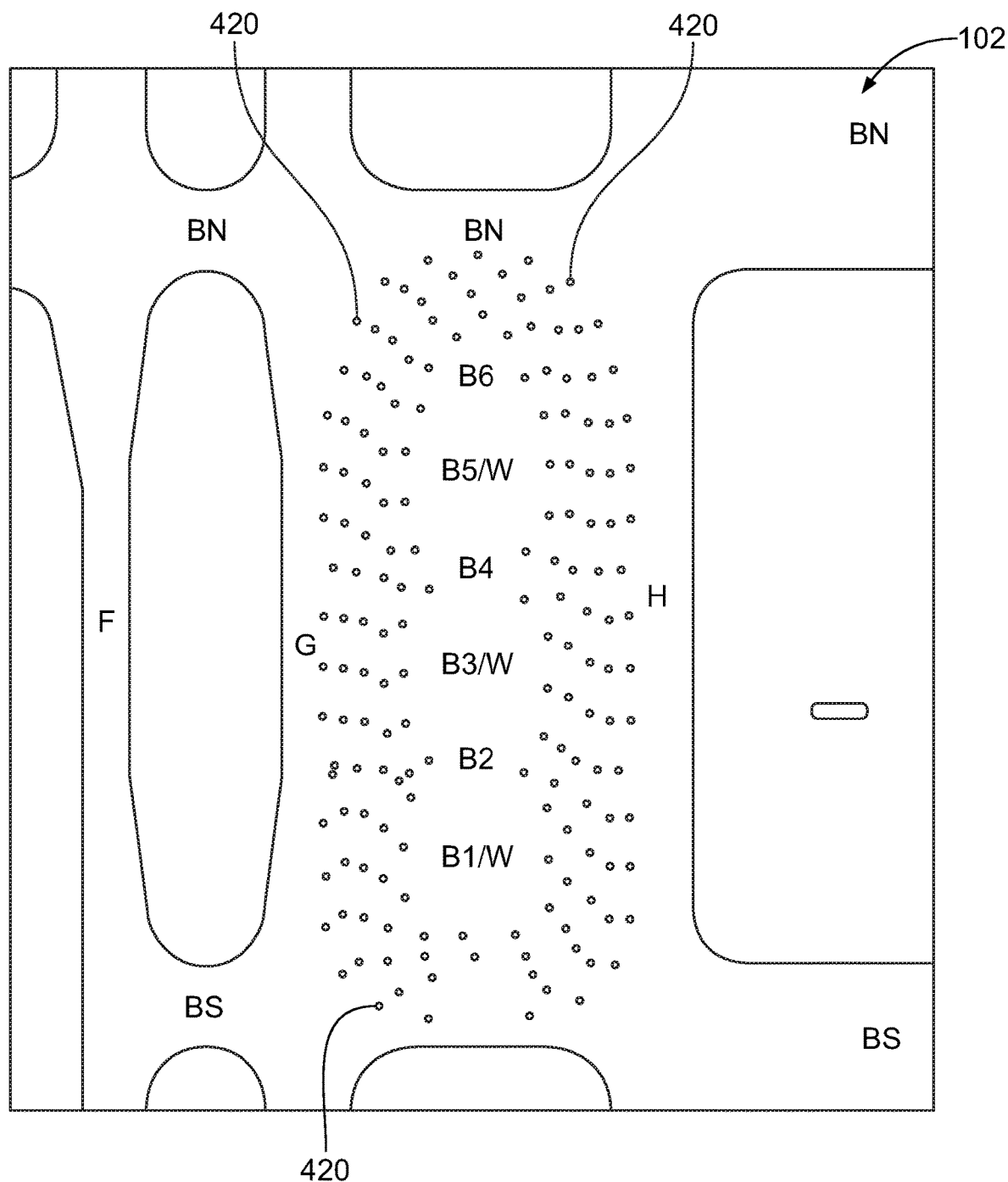
FIG. 23 illustrates de-icing label candidate locations on an airport map, according to an embodiment of the subject disclosure.

FIG. 22 illustrates de-icing stands 408 on an airport map 102, according to an embodiment of the subject disclosure. FIG. 23 illustrates de-icing label candidate locations 420 on an airport map 102, according to an embodiment of the subject disclosure.

Referring to FIGS. 1 and 19-23, the map labeling control unit 104 identifies geometries that include deicing entities and the groups to which they belong. Containerization is done on a group (super-containers) and individual (sub-containers) level. The criteria used is geometric proximity, the "idobject" attribute, and the "idbase" attribute.

The map labeling control unit 104 identifies broad geometric clusters of deicing features based on geometry considerations and places them in super-containers. The name "DE-ICE" is assigned to these containers and an overall geometry is calculated, thereby pricing the an anchor geometry for group labeling with respect to the third zoom level (for example, the 2 km zoom level) and the fourth zoom level (for example, the 1 km zoom level). The map labeling control unit 104 parses the idobject and idbase attributes of the features of the super-containers for a unique qualifier. If a unique qualifier is found, it is added to the "DE-ICE" label text. The map labeling control unit 104 parses the set of features again, checking for geometries that are part of existing parking stand containers. The criteria are either idobject or idbase are equal to the parking stand name, and the distance between the two geometries is zero. These polygons are then moved to parking stand containers. Polygon features in each super-container are grouped (by idobject or idbase) into individual sub-containers of the super-container to which they belong. There are cases in which a feature does not belong to any sub-container. It should not be labeled even if there is a valid idobject attribute. Heuristic techniques are used to identify such features.

The map labeling control unit 104 analyzes the sub-containers to determine which sub-container should be labeled on the fourth zoom level (for example, the 1 km zoom level) according to the following rules: (1) If there is only one sub-container in the super-container, its label text is added to the "DE-ICE" name of the super-container, and it is excluded from labeling; (2) If there are parking stands neighboring the feature, the sub-container will not be labeled on the 1 km level; (3) Group labeling of all super-containers will still be applied at the 1 km level. Remaining sub-containers are treated further as parking stands.

In at least one embodiment, the areas on the airport map 102 are deicing locations (such as deicing pads and stands) of an airport as represented on the airport map. The map labeling control unit 104 generates label candidates for the deicing locations on the airport map 102, and evaluates the label candidates for the deicing locations, such as to determine positions of the labels for the deicing locations on the airport map 102.

For example, the map labeling control unit 104 generates deicing label candidates. In at least one embodiment, the map labeling control unit handles deicing sub-containers as parking stands, as described herein. After containerization, each deicing group has an anchor geometry and a label text, including the word "DE-ICE" and a short qualifying identifier, which is optional. Candidate generation for deicing locations (such as deicing pads) is different than building labels. The map labeling control unit 104 can label at the center of a combined geometry. At the 1 km level, the center is usually occupied by deicing stands. Unlike building labels, placing the common label of the deicing location outside the common geometry is allowed. The map labeling control unit 104 places label candidates equidistantly along concentric curves along the combined geometry of the centered sub-container labels, thereby ensuring sufficient coverage of the space around the individual deicing stands without using too many candidates.

The map labeling control unit 104 also evaluates the deicing label candidates. In at least one embodiment, one criteria is used for assigning qualities to the DE-ICE label candidates, namely, the distance to the center of the deicing group geometry. The quality is highest in the center and decreases with the distance to the center.

Figure 24:
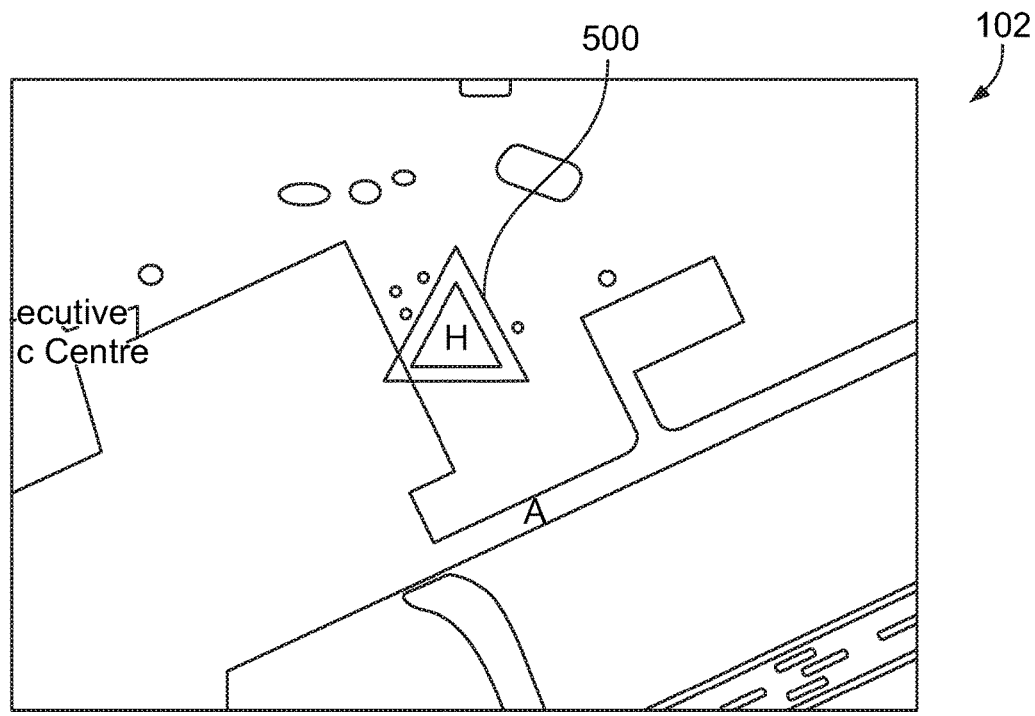
FIG. 24 illustrates a helipad symbol on an airport map, according to an embodiment of the subject disclosure.
Figure 25:
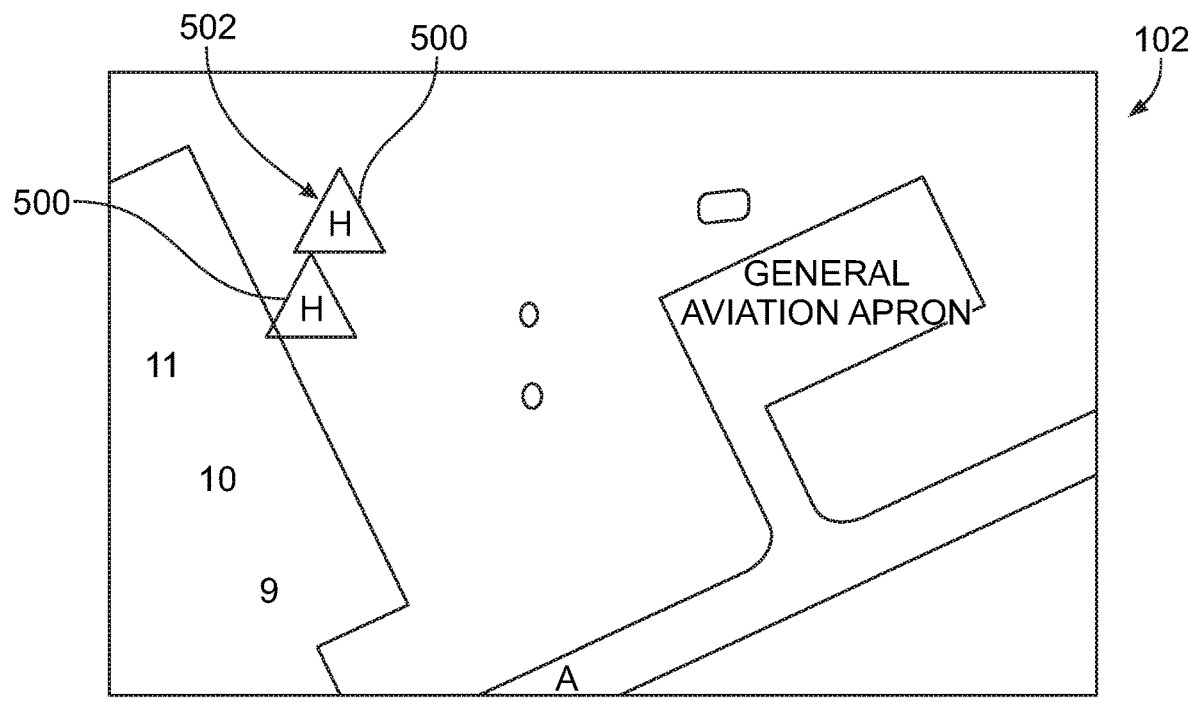
FIG. 25 illustrates a double helipad symbol on an airport map, according to an embodiment of the subject disclosure.

FIG. 24 illustrates a helipad symbol 500 on an airport map 102, according to an embodiment of the subject disclosure. FIG. 25 illustrates a double helipad symbol 502 on an airport map, according to an embodiment of the subject disclosure. Referring to FIGS. 1, 24, and 25, the map labeling control unit 104 is also configured to label helipad symbols 500 on the airport map 102.

In at least one embodiment, the map labeling control unit 104 labels the helipad symbols 500 at the third zoom level (for example, the 2 km zoom level), and the third zoom level (for example, the 1 km zoom level). Helipads do not have specific names. Accordingly, a common symbol is used to denote the helipads.

The map labeling control unit 104 containerizes the helipads. Two airport moving map database features determine helipad labeling: (1) Helipad Final Approach and Take Off Area—FATO, and (2) Helipad Touch Down and Lift Off Areas—TLOF. A helipad can have any number of each. If they form an adjacent cluster, this is considered one helipad. The map labeling control unit 104 performs containerization by providing all FATO and TLOF features for an airport into cluster containers with a minimum distance as a cutoff.

In at least one embodiment, the areas on the airport map 102 are helipads of an airport as represented on the airport map 102. The map labeling control unit 104 generates label candidates for the helipads on the airport map, 102 and evaluates the label candidates for the helipads, such as to determine positions of the labels for the helipads on the airport map 102.

For example, the map labeling control unit 104 generates helipad label candidates. At the fourth zoom level (for example, the 1 km level), each cluster is assigned the single helipad symbol. Candidates are placed in the center of each geometry, which is part of the cluster. At the third zoom level (for example, the 2 km level), the approach is the same, but if any two of the cluster container geometries are disjointed, the double helipad symbol is assigned to the cluster.

The map labeling control unit 104 evaluates the helipad label candidates. All label candidates for all helipad features have the same quality values. That is, the label candidates for each of the helipad features have a common quality value. Helipad labels are allowed to overlap each other to the extent of the "H" symbols, but they are not allowed to overlap with other labels.

Figure 26:
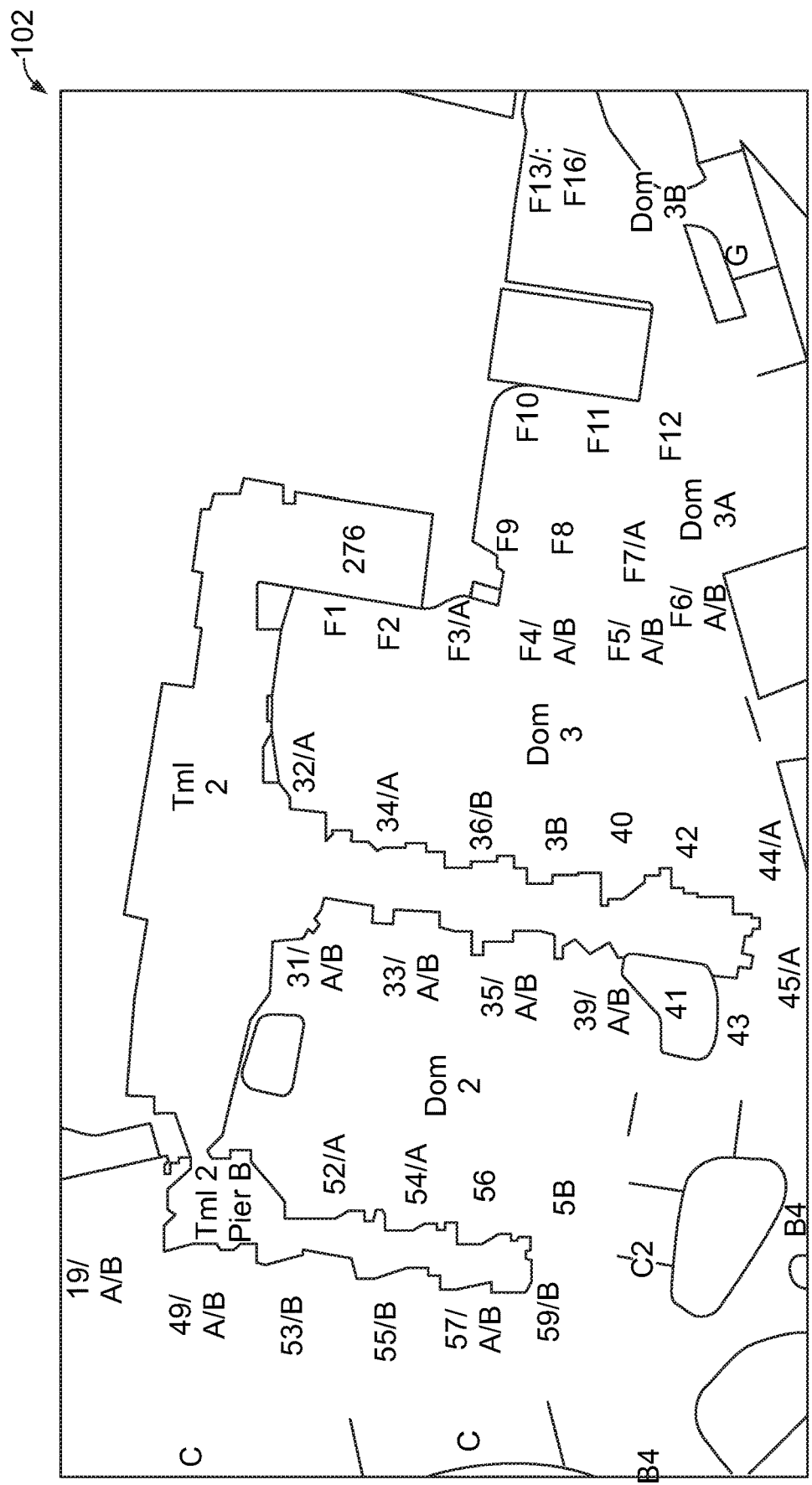
FIG. 26 illustrates parking stands on an airport map, according to an embodiment of the subject disclosure.

FIG. 26 illustrates parking stands (such as stands 31/AB and 52/A) on an airport map 102, according to an embodiment of the subject disclosure. Referring to FIGS. 1 and 26, the map labeling control unit 104 is also configured to label the parking stands on the airport map 102.

In at least one embodiment, the areas on the airport map 102 are parking stands of an airport as represented on the airport map 102. The map labeling control unit 104 generates label candidates for the parking stands on the airport map 102, and evaluates the label candidates for the parking stands, such as to determine positions of the labels for the parking stands on the airport map 102.

For example, the parking stands are the main labeled feature on the fourth zoom level (for example, the 1 km zoom level) and have the highest priority at the fourth zoom level. In at least one embodiment, all parking stands shown in the fourth zoom level are labeled.

The map labeling control unit 104 processes parking stands differently than other features in a number of ways. First, a parking stand feature can have multiple names. All of them should be presented in the label text. Next, parking stand features are usually in a sequence. The readability of the labels depends on the orderliness and placement of the whole sequence. Further, there is very little space for placing candidates. Also, parking labels can be dropped only because of other parking labels. Next, parking stand labels can be combined. The combined label should present the names of all parking stands combined. For these reasons the parking stand preprocessing, candidate generation, evaluation and positioning are done together.

With respect to parking stands name processing, the parking stand feature id (idobject attribute) is a concatenation of its different names, divided by the "_" sign—ID1_ID2_ . . . _IDN. The original id attribute (called here rawID) cannot be used for label texts. Reformatting the ids aim at shortening the label text while preserving information about the individual names.

FIG. 27 illustrates a table that translates parking stand raw ID with displayed text, according to an embodiment of the subject disclosure. The table shows examples of rawIDs and how they translate into one or two line label text. The rawID is split into parts, which are then sorted (keeping numeric sort for numeric tokens). Name sequences are identified and the label text constructed by either factoring out common tokens or omitting the middle elements of longer sequences. If necessary, the resulting string is broken into two lines. The same name processing procedure is used to determine the label text of combined parking stands Referring again to FIGS. 1 and 26, parking containers are created on two levels—individual containers for each parking stand, and super-containers, containing groups of individual containers. These will eventually represent sequences and parking clusters, the labels of which are analyzed (for example, generated, evaluated, and the like) as a group, rather than individually. This approach preserves the symmetries originating from the natural parking stand alignment and contributes to better map readability. Initial containers are created (by the map labeling control unit 104) using the following steps. First, all parking stands are broken into (for example, grouped into) initial clusters based on the "idapron" attribute. If such an attribute does not exist, the cluster criterion is distance. Second, the parking stand features for each cluster are placed in parking containers based on their raw name. Third, deicing stand feature geometries belonging to parking stands are added. Fourth, deicing stand containers identified during de-icing area containerization are added as well. Firth, raw IDds are translated into displayID and set as container IDs. Sixth, initial symbols with the display ID text are created. Seventh, for each parking stand, one candidate is created in the center of the geometry of the stand. After this initial step, all parking stands and all deicing stands are containerized and grouped in large super-containers that are ready to be labeled.

Like in the case of most other features, the best placement of a parking stand label is in the center of the parking stand geometry. Placing all parking labels in such a way is possible for most airports. A "neighbor graph" is created, with nodes being the label candidates (only one per parking stand). Edges are added if two labels' bounding circles are within a certain Neighbor Qualifying Distance (NQD). Such a graph is used further for parking stand sequence detection with different NQD's. For this case NQD=0 and, if there are no edges in the graph, there will be no conflicts and all parking labels can be placed at the center. If this is the case, label features are created for each parking stand and added to the global set of label features for this zoom level. They are one per parking label and conflict free, so the size of the conflict graph will stay low, and deconfliction occurs faster.

Figure 28:
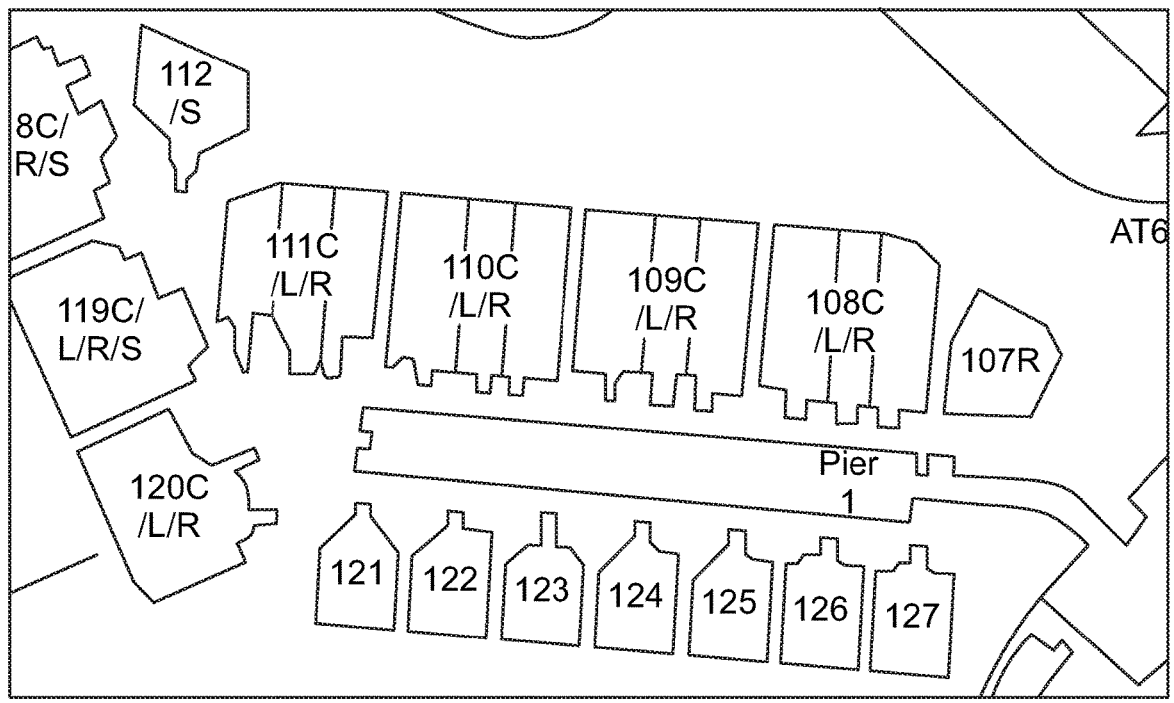
FIG. 28 illustrates parking stands that are combined based on last character on an airport map, according to an embodiment of the subject disclosure.

If complete and conflict free parking stand label placement is not possible (for example, there is at least one edge in the neighbor graph), combining trivial parking stand groups is performed. In order for the combining to occur, the labels have a common header in their names, and the differences should be only in the last character. The last character at this stage cannot be a number, except if it is part of the common header. For example, A1, A1A, and A1B can be combined into one—A1A/B, 1A, 1B, 1C, 1D can be combined into 1A:1D, but groups like A1, A2, A3 are not combined—they can be part of a sequence. FIG. 28 illustrates parking stands that are combined based on last character on an airport map, according to an embodiment of the subject disclosure.

The map labeling control unit 104 combines as follows. First, all raw labels are concatenated with a "_" character separating them. Second, the resulting string is split into parts. Third, the parts are sorted, so that numerical subparts are sorted numerically and all the others—lexicographically (A9 comes before A10, 5B is before 55A). Fourth, combinable sections of the sorted sequence are identified. Firth, the parking stand containers that these name parts belong to are found. Sixth, a new container is created with the geometries identified in the previous step. Seventh, the combined container rawId is set to the concatenated parts. Eighth, the new container's display ID is established as in Step 1. Ninth, a single candidate with the combined label text is placed in the center of the combined geometry. Tenth, center labeling is attempted again with the modified label set. If there are no conflicts, label features are created and added to the global label feature set. Preprocessing is then complete.

Even though this technique is very efficient and produces well centered label sets, it may not be appropriate for a small number of airports. An airport level user property is provided when this option needs to be turned off. If a Do-Not-Combine option is set to true for a certain airport, the map labeling control unit 104 skips the combining and moves on to sequence identification.

Figure 29:
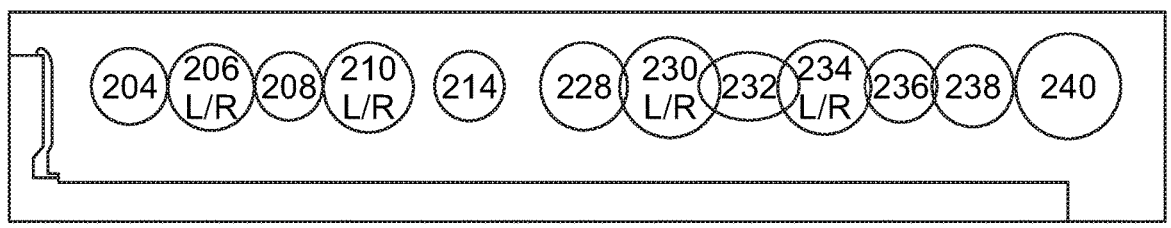
FIG. 29 illustrates sequence identification of parking stands, according to an embodiment of the subject disclosure.
Figure 30:
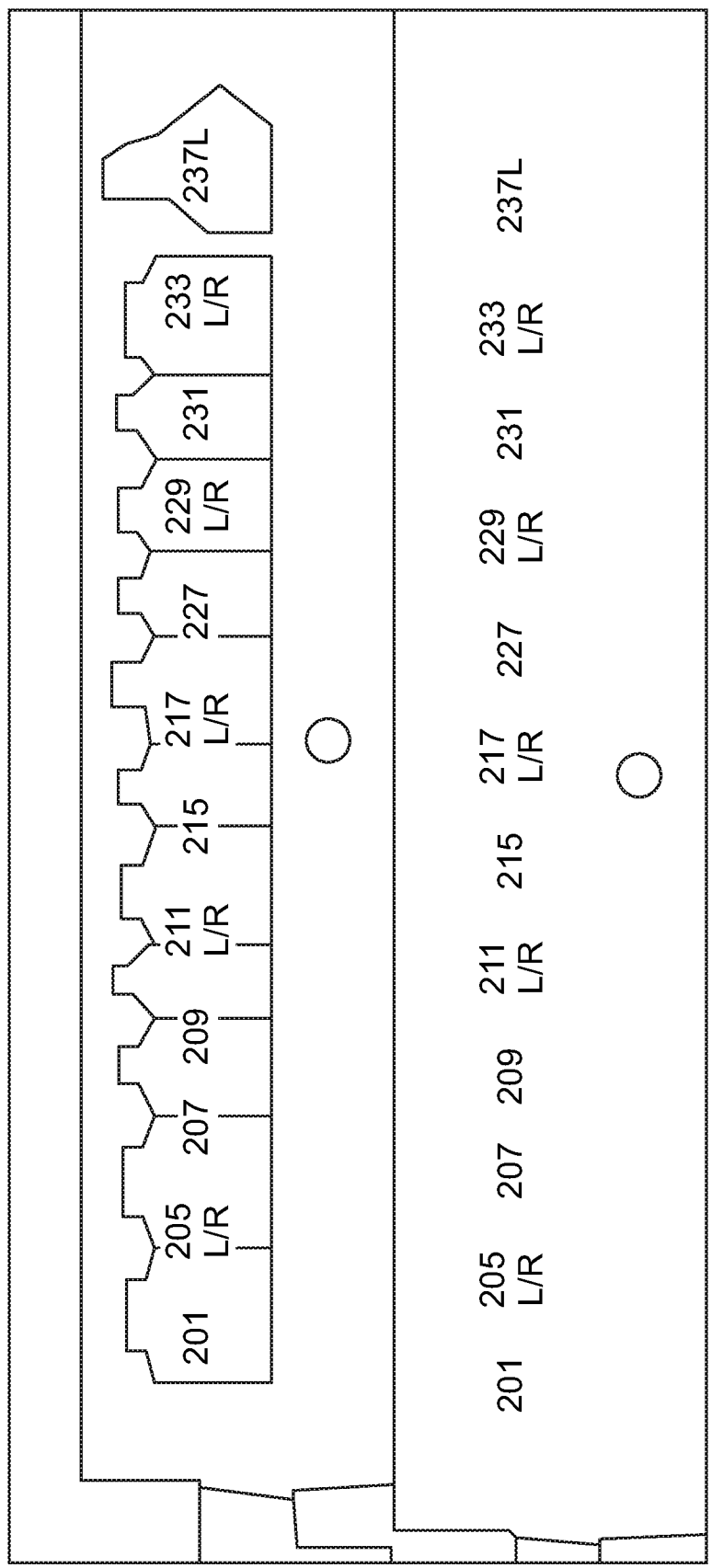
FIG. 30 illustrates spread labeling of parking stands along a sequence anchor line, according to an embodiment of the subject disclosure.

FIG. 29 illustrates sequence identification of parking stands, according to an embodiment of the subject disclosure. FIG. 30 illustrates spread labeling of parking stands along a sequence anchor line, according to an embodiment of the subject disclosure.

In terms of sequence identification, most parking stand labels are placed in sequences, such as around terminals and concourses or on separate dedicated aprons. The sequences are identified and handled as a whole, in order to produce well-ordered and readable results. The sequences are determined in terms of neighboring parking symbol bounding circles. Two symbols are considered neighbors, if their bounding circles are within a certain neighbor qualifying distance (NQD) from one another. A group of symbols S1, S2, . . . , SN form a sequence if S1 has only S2 as a neighbor, S2's neighbors are S1 and S3, . . . , SN−1's neighbors are SN−2 and SN, and SN's only neighbor is SN−1.

On one hand, it is preferred to extract longer sequences (i.e., to place in a sequence even symbols without overlaps), because this allows for more space for label adjustment. But for bigger NQDs, symbols will have more labels and may not fulfill the sequence definition. On the other hand, it is preferred to extract as many sequences as possible to keep the map orderly and readable. That is why sequences are extracted from the neighbor graph in several rounds with decreasing NQD, until there is nothing more to extract or all remaining symbols have three or more neighbors. The neighbor graph is recalculated for every round.

Sequence processing includes several steps and after each step the sequence is checked for overlaps. If there are no overlap, the sequence's label candidates are committed. All calculations are based on the sequence's anchor line. The anchor line is a polyline connecting the currently calculated centers of the label symbols in the sequence. Initially, these are the center points of the parking stands' geometries. Thus, the label candidates are in the vertices of the anchor line. The anchor line goes through a series of modifications until either the sequence has no overlapping symbols or the distance limit of label movement is reached.

In terms of sequence spreading, if the sequence has only one stand or none of the labels in the sequence are overlapping, then it is committed right away. If this is not the case, the map labeling control unit 104 attempts to spread the labels along the anchor line. For example, the map labeling control unit compares the length of the anchor line against the sum of the symbols diameters, and if the line is long enough, it places the label symbols along the anchor line, so that the distance between two neighboring symbols is the same. If necessary, the two ends of the anchor line are extended by half the symbol's length for additional room. Moving the labels along the anchor line first (as opposed to away from it) improves readability by perceiving the sequence as a whole.

Figure 31:
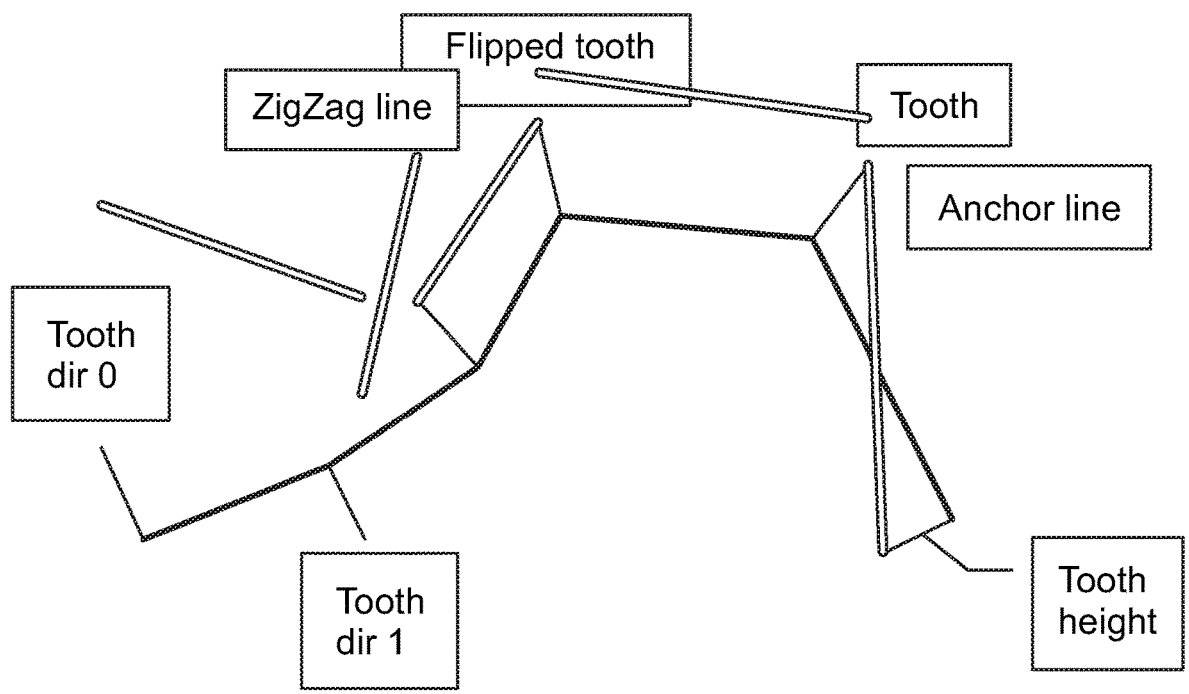
FIG. 31 illustrates a zigzag pattern, according to an embodiment of the subject disclosure.

FIG. 31 illustrates a zigzag pattern, according to an embodiment of the subject disclosure. If spreading the labels along the sequence anchor line is not enough to avoid overlaps, then the labels are moved aside from it, alternating the direction of the offset and keeping the offset to the smallest possible. In the zigzag pattern, each vertex of the initial anchor line is moved a certain (constant) distance Z along the bisector of the angle on which it is placed. The first and last "teeth" are moved perpendicular to the line segments to which they belong. The direction of the offset alternates. There might be teeth that are "flipped"—offset in the direction opposite to their calculated direction, but two adjacent teeth cannot be flipped. The zigzag line can start on direction 0 (left) or direction 1 (right). The algorithm starts with tooth height 0 and moves gradually to a specified maximum value, so that the labels do not go outside the polygons they label. Each calculated zigzag line is checked for label overlaps, and if such is found, the algorithm commits the sequence. On each iteration, both left and right zigzags are tried and also odd and even tooth flipping for teeth than have overlaps. If the maximum tooth height is reached and there are still overlaps, the overlapping labels are taken out of the sequence and put in the "clustered stands" pool for the next step. The non-overlapping members of the sequence are committed.

In terms of parking stands cluster processing, the remaining parking symbols that still have overlaps and cannot be identified as a sequence are put into a pool for cluster labeling. The pool is then is combined by suffix that can also include numeric values. Due to the variety of small parking stand configurations, the result of this step can be verified. As such, this step can be preempted and controlled. For example:

$$EGSC\cdot ParkingClusters = W1:W8|X1:X8, Y1:Y8|Z1:Z8$$

The map labeling control unit 104 can interpreted this as: All stands with IDids between W1 and W8 and between X1 and X8 will be combined under one label, the first line will be W1:W8 and the second X1:X8. Similarly, Y1:Y8 and Z1:Z8 are combined.

Figure 32:
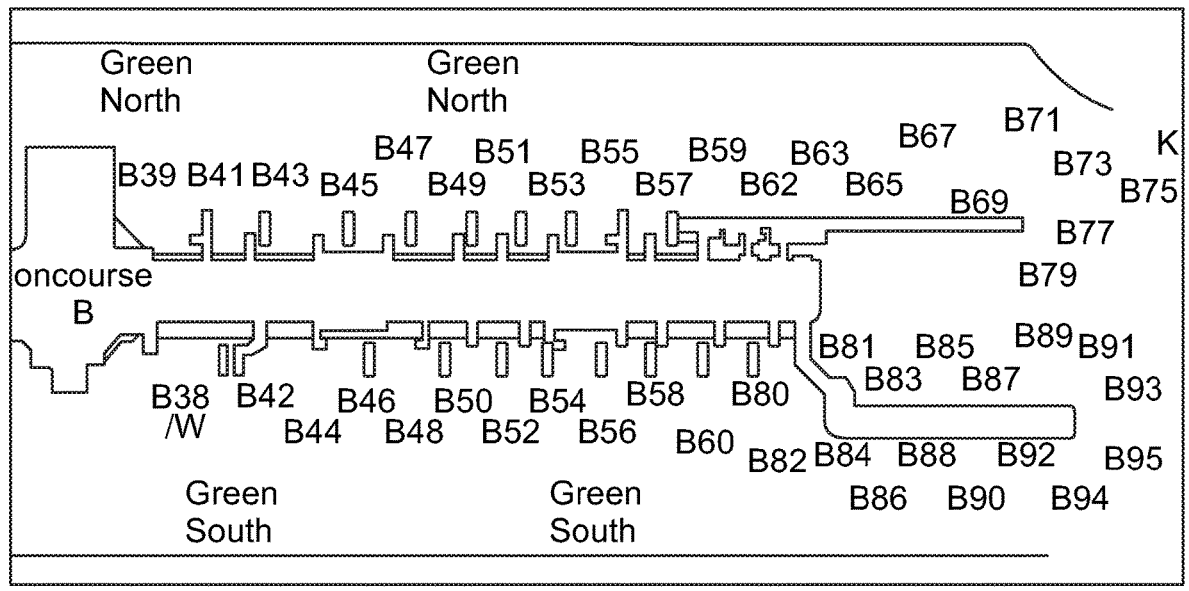
FIG. 32 illustrates zigzag labeling of parking stands, according to an embodiment of the subject disclosure.
Figure 33:
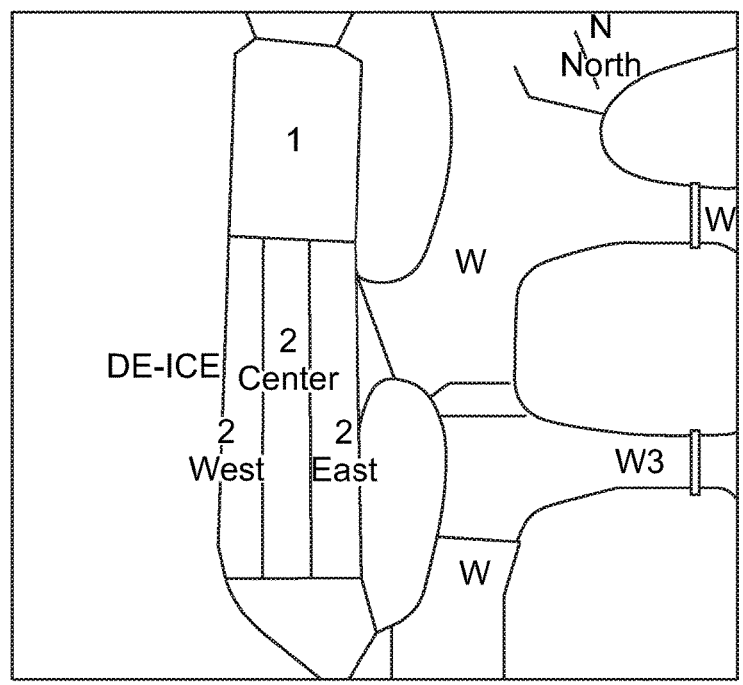
FIG. 33 illustrates zigzag labeling of deicing stands, according to an embodiment of the subject disclosure.

FIG. 32 illustrates zigzag labeling of parking stands, according to an embodiment of the subject disclosure. FIG. 33 illustrates zigzag labeling of deicing stands, according to an embodiment of the subject disclosure.

Figure 34:
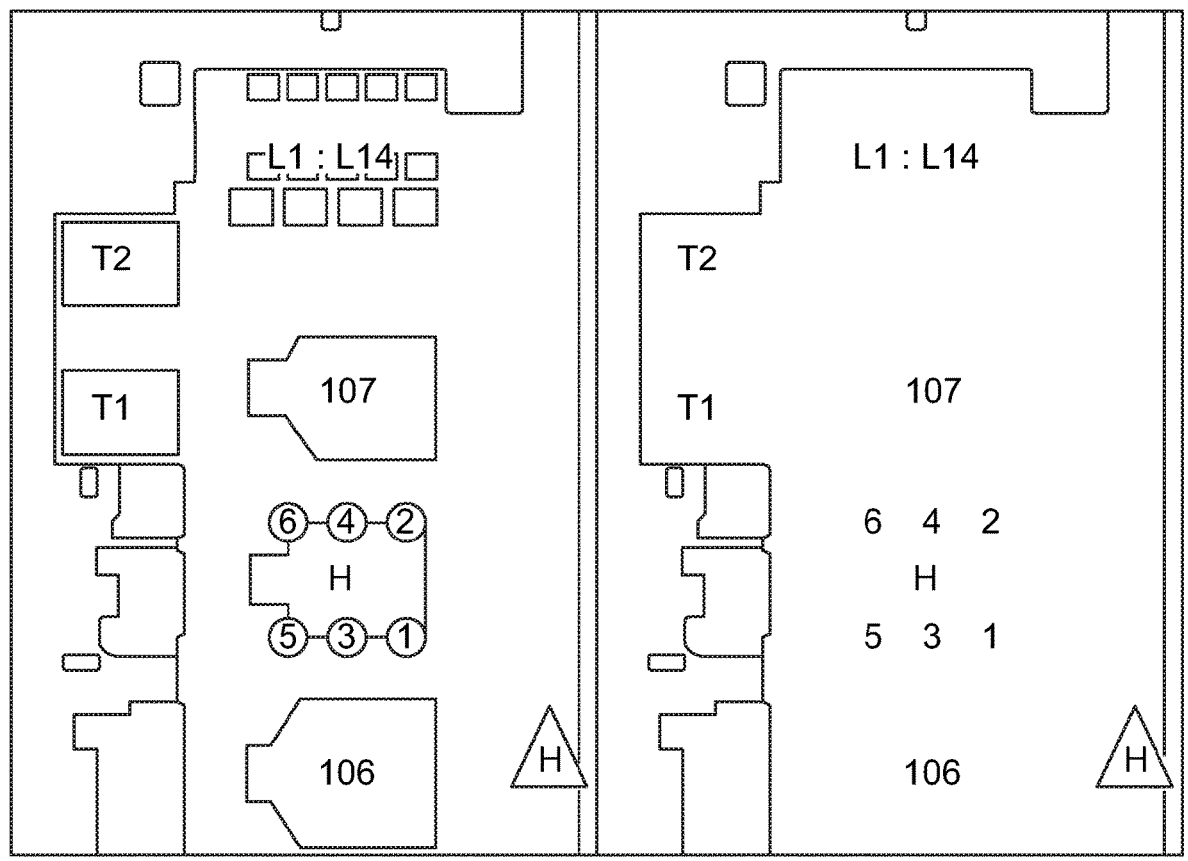
FIG. 34 illustrates parking cluster label L1:L4, according to an embodiment of the subject disclosure.
Figure 35:
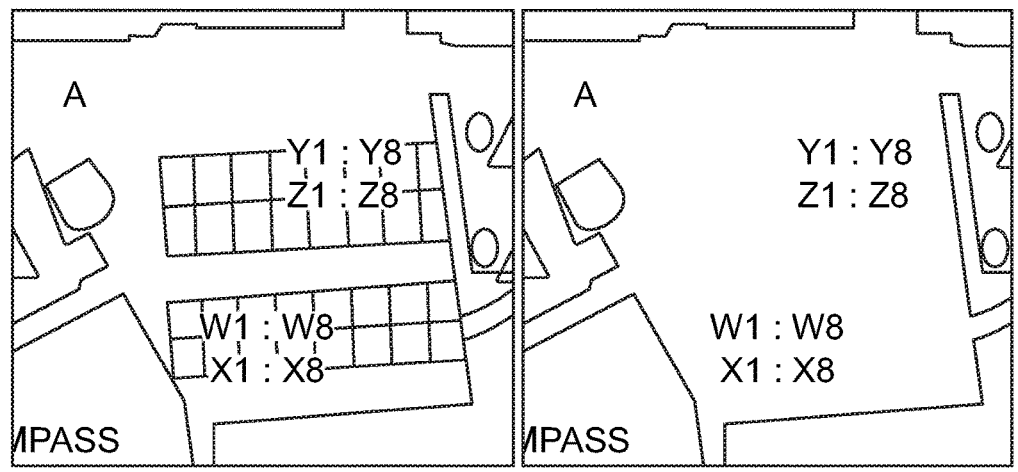
FIG. 35 illustrates parking cluster labeling, according to an embodiment of the subject disclosure.

FIG. 34 illustrates parking cluster label L1:L4, according to an embodiment of the subject disclosure. FIG. 35 illustrates parking cluster labeling, according to an embodiment of the subject disclosure.

The map labeling control unit 104 groups the features that qualify for the parking clusters entry at the very beginning of parking stand processing, and puts the combined feature in the list for general processing. If this does not get picked by any sequence, then multiple label candidates are created—one for each polygon in the combined feature. In the example above, the two labels were in a sequence and labeled by the zigzag method.

Referring again to FIG. 1, in at least one embodiment, the areas on the airport map 102 are aprons of an airport as represented on the airport map 102. The map labeling control unit 104 generates label candidates for the aprons on the airport map 102, and evaluates the label candidates for the aprons, such as to determine positions of the labels for the aprons on the airport map 102.

For example, the map labeling control unit 104 labels aprons. Aprons are labeled in a way similar to buildings. Containerization is done by ID only. If the ID is not valid, the apron is not labeled. The apron is also not labeled if it contains the string de-ice, or if the name of the apron is the same as some a label of a building. Candidate generation is by simple raster—only candidates with a center point inside the apron geometry are considered. Candidate qualities are assigned in the same way as building candidates.

The last phase of the labeling process is the actual placement of the labels. Within this task, a set of label candidates is selected so that maximum features are labeled without the labels overlapping. In at least one embodiment, a single conflict graph can be an input analyzed by the map labeling control unit 104. The nodes of the single conflict graph are label candidates and edges are candidate pairs that cannot be placed simultaneously.

The map labeling control unit 104 builds the conflict graph as follows. First, with respect to every two labels of which the bounding circles overlap, the labels are connected by an edge. If one of the labels is a helipad symbol, and the other is not, then the helipad label boundary includes the triangular shape (bigger for the double helipad symbol). If both nodes are helipad symbols, only the "H" text is considered for calculating overlaps. Next, more edges are added to handle the consistent abbreviation feature. For every feature that has an abbreviation there are two sets of candidates, for example "Terminal 1"/"Tml 1" and "Terminal 2"/"Tml 2". Because both features have to be either abbreviated together, all "Tml 1" candidates are declared to be in conflict with all "Terminal 2" candidates, and all "Terminal 1" candidates in conflict with "Tml 2" candidates. These edges are added to the graph, even though the label candidate may not overlap.

Complexity of the algorithm is 0 (nodes+edges^2) so it will have better performance if the number of candidates is low, and particularly if the number of candidate overlaps is low. In this respect, an artificial element added to the graph can lead to exponential increase in the size of the graph. To prevent this, limits to the number of candidates are put on building and apron labels.

Figure 36:
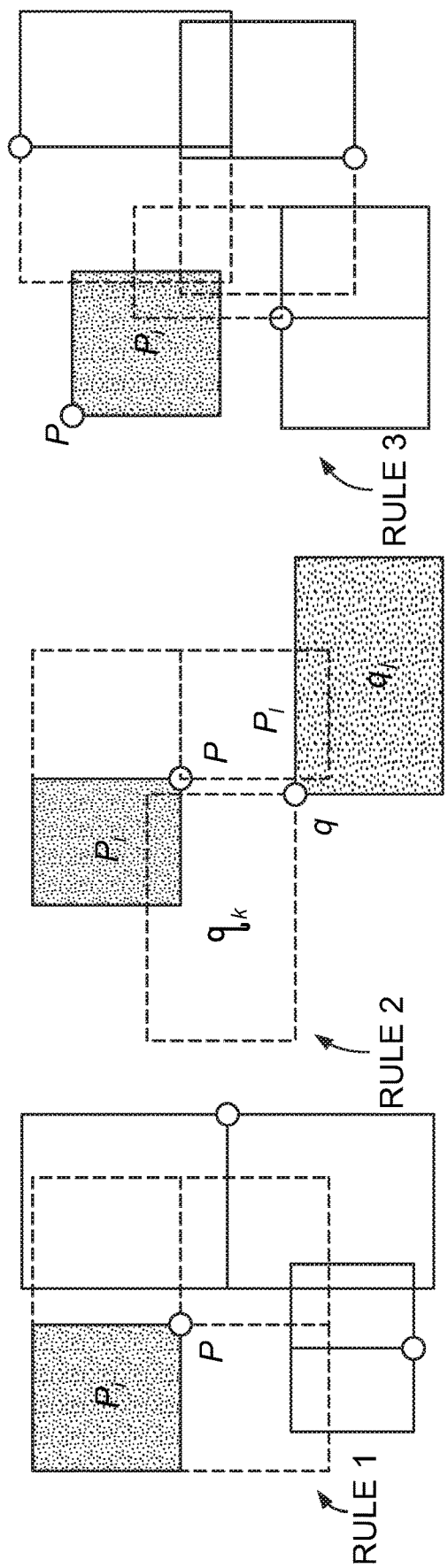
FIG. 36 is a diagrammatic representation of conflict rules 1, 2, and 3.

FIG. 36 is a diagrammatic representation of conflict rules 1, 2, and 3. The two phase label placement algorithm starts with a deterministic part of three rules and a heuristic step aimed to resolve conflicts not handled by the deterministic part. The first rule is if p has a candidate $p_i$, without any conflicts, declare $p_i$ to be part of the solution, and eliminate all other candidates of p. The second rule is if p has a candidate $p_i$ that is only in conflict with $q_k$, and q has a candidate $q_j$ (in which j does not equal k) that is only overlapped by $p_l$ (in which l does not equal i), then add $p_i$ and $q_j$ to the solution and eliminate all other candidates of p and q. The third rule is if p has only one candidate $p_i$ left, and the candidates overlapping $p_i$ form a clique, then declare $p_i$ to be part of the solution and eliminate all candidates that overlap $p_i$.

Embodiments of the subject disclosure provide systems and methods that allow large amounts of data to be quickly and efficiently analyzed by a computing device. For example, an airport map includes numerous areas that are associated with attributes. The labels for each of the areas at different zoom levels differs. As such, large amounts of data are being tracked and analyzed. The vast amounts of data are efficiently organized and/or analyzed by the map labeling control unit 104, as described above. The map labeling control unit 104 analyzes the data in a relatively short time in order to quickly and efficiently determine positions of labels on an airport map. A human being would be incapable of efficiently analyzing such vast amounts of data in such a short time. Indeed, embodiments of the subject disclosure provide systems and methods that save hundreds of hours of manual effort in the labeling of the various areas of an airport map. Further, embodiments of the subject disclosure decease a time to market for airport maps, and improve data application through dynamic labeling. As such, embodiments of the subject disclosure provide increased and efficient functionality, and vastly superior performance in relation to a human being analyzing the vast amounts of data.

In at least one embodiment, components of the systems and methods, such as the map labeling control unit 104, provide and/or enable a computer system to operate as a special computer system for labeling an airport map.

As described herein, embodiments of the subject disclosure provide systems and methods for efficiently and effectively labeling areas on an airport map. Further, embodiments of the subject disclosure provide systems and methods for automatically labeling areas on an airport map. Moreover, embodiments of the subject disclosure provide systems and methods for labeling areas on an airport map that are not prone to human error.

Further, the disclosure comprises embodiments according to the following clauses:

Clause 1. A method comprising:
generating, by a map labeling control unit comprising a processor, label candidates for areas of an airport map;
evaluating, by the map labeling control unit, the label candidates to determine positions of labels for the areas of the airport map; and
determining, by the map labeling control unit, different sets of labels to display for different views of the airport map.

Clause 2. The method of Clause 1, further comprising generating, by the map labeling control unit, a conflict graph regarding the labels that depicts one or more conflicts between two or more of the labels.

Clause 3. The method of Clause 2, further comprising resolving, by the map labeling control unit, the one or more conflicts between two or more of the labels.

Clause 4. The method of any of Clauses 1-3, wherein the areas on the airport map comprise buildings of an airport as represented on the airport map.

Clause 5. The method of any of Clauses 1-4, wherein said generating comprises:
creating one label candidate in a center of a first area;
generating a series of horizontal lines equidistantly from the center to a highest boundary and a lowest boundary of the first area;
determining intersections with the first area; and
identifying a middle point of a segment as a first label candidate.

Clause 6. The method of any of Clauses 1-5, wherein said evaluating comprises determining a quality metric for each of the label candidates.

Clause 7. The method of any of Clauses 1-6, wherein the areas on the airport map comprise taxiways of an airport as represented on the airport map.

Clause 8. The method of any of Clauses 1-7, wherein said generating comprises:
determining segments of the taxiways to be labeled;
determining a number of labels to place on the segments; and
positioning labels along anchor lines of the segments.

Clause 9. The method of any of Clauses 1-8, wherein said evaluating comprises determining a quality metric for each of the label candidates.

Clause 10. The method of any of Clauses 1-9, wherein the map labeling control unit segments each of the taxiways into polygonal elements.

Clause 11. The method of any of Clauses 1-10, wherein the areas on the airport map comprise deicing locations of an airport as represented on the airport map.

Clause 12. The method of any of Clauses 1-11, wherein said generating comprises placing the label candidates equidistantly along geometry of centered sub-container labels.

Clause 13. The method of any of Clauses 1-12, wherein said evaluating comprises assigning qualities to the label candidates based on a center of a group geometry.

Clause 14. The method of any of Clauses 1-13, wherein the areas on the airport map comprise helipads of an airport as represented on the airport map.

Clause 15. The method of any of Clauses 1-14, wherein said generating comprises:

assigning a helipad symbol; and placing the label candidates in a center of respective geometries.

Clause 16. The method of any of Clauses 1-15, wherein said evaluating comprises assigning a common quality value to each of the label candidates.

Clause 17. The method of any of Clauses 1-16, wherein the areas on the airport map comprise parking stands of an airport as represented on the airport map.

Clause 18. The method of any of Clauses 1-17, further comprising:

placing, by the map labeling control unit, parking stand features for each of the initial clusters into parking containers; and containerizing and grouping all of the parking stands in super-containers to be labeled.

Clause 19. The method of any of Clauses 1-18, further comprising combining, by the map labeling control unit, at least two of the parking stands based on a last character.

Clause 20. The method of any of Clauses 1-19, wherein said generating the label candidates comprises generating the label candidates as a group.

Clause 21. The method of any of Clauses 1-20, wherein said evaluating the label candidates comprises evaluating the label candidates as a group.

Clause 22. The method of any of Clauses 1-21, wherein the areas on the airport map comprise aprons of an airport as represented on the airport map.

Clause 23. The method of any of Clauses 1-22, wherein said determining comprises:

providing, by the map labeling control unit, first labels for first areas on the airport map at a first zoom level;

providing, by the map labeling control unit, second labels for second areas on the airport map at a second zoom level that is less than the first zoom level;

providing, by the map labeling control unit, third labels for third areas on the airport map at a third zoom level that is less than the second zoom level; and providing, by the map labeling control unit, fourth labels for fourth areas on the airport map at a fourth zoom level that is less than the third zoom level.

Clause 24. The method of any of Clauses 1-23, wherein the first areas at the first zoom level comprise major buildings, wherein the second areas at the second zoom level comprise major taxiways, wherein the third areas at the third zoom level comprise all shown taxiways and deicing locations, and wherein the fourth areas at the fourth zoom level comprise all shown parking stands.

Clause 25. A system comprising:

a map labeling control unit comprising a processor, wherein the map labeling control unit is configured to operate according to any of Clauses 1-24.

Clause 28. A non-transitory computer-readable storage medium comprising executable instructions that, in response to execution, cause a map labeling control unit comprising a processor, to perform operations according to any of Clauses 1-24.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

generating, by a map labeling control unit comprising a processor, label candidates for areas of an airport map;

evaluating, by the map labeling control unit, the label candidates to determine positions of labels for the areas of the airport map, wherein said evaluating comprises determining a quality metric for each of the label candidates; and determining, by the map labeling control unit, different sets of labels to display for different views of the airport map.

2. The method of claim 1, further comprising generating, by the map labeling control unit, a conflict graph regarding the labels that depicts one or more conflicts between two or more of the labels.

3. The method of claim 2, further comprising resolving, by the map labeling control unit, the one or more conflicts between two or more of the labels.

4. The method of claim 1, wherein the areas on the airport map comprise buildings of an airport as represented on the airport map.

5. The method of claim 4, wherein said generating comprises:
creating one label candidate in a center of a first area;
generating a series of horizontal lines equidistantly from the center to a highest boundary and a lowest boundary of the first area;
determining intersections with the first area; and
identifying a middle point of a segment as a first label candidate.

6. The method of claim 1, wherein the areas on the airport map comprise taxiways of an airport as represented on the airport map.

7. The method of claim 6, wherein said generating comprises:
determining segments of the taxiways to be labeled;
determining a number of labels to place on the segments; and
positioning labels along anchor lines of the segments.

8. The method of claim 1, wherein the map labeling control unit segments each of the taxiways into polygonal elements.

9. The method of claim 1, wherein the areas on the airport map comprise deicing locations of an airport as represented on the airport map.

10. The method of claim 9, wherein said generating comprises placing the label candidates equidistantly along geometry of centered sub-container labels.

11. The method of claim 9, wherein said evaluating comprises assigning qualities to the label candidates based on a center of a group geometry.

12. The method of claim 1, wherein the areas on the airport map comprise helipads of an airport as represented on the airport map.

13. The method of claim 12, wherein said generating comprises:
assigning a helipad symbol; and
placing the label candidates in a center of respective geometries.

14. The method of claim 12, wherein said evaluating comprises assigning a common quality value to each of the label candidates.

15. The method of claim 1, wherein the areas on the airport map comprise parking stands of an airport as represented on the airport map.

16. The method of claim 15, further comprising:
placing, by the map labeling control unit, parking stand features for each of the initial clusters into parking containers; and
containerizing and grouping all of the parking stands in super-containers to be labeled.

17. The method of claim 15, further comprising combining, by the map labeling control unit, at least two of the parking stands based on a last character.

18. The method of claim 15, wherein said generating the label candidates comprises generating the label candidates as a group.

19. The method of claim 15, wherein said evaluating the label candidates comprises evaluating the label candidates as a group.

20. The method of claim 1, wherein the areas on the airport map comprise aprons of an airport as represented on the airport map.

21. The method of claim 1, wherein said determining comprises:
providing, by the map labeling control unit, first labels for first areas on the airport map at a first zoom level;
providing, by the map labeling control unit, second labels for second areas on the airport map at a second zoom level that is less than the first zoom level;
providing, by the map labeling control unit, third labels for third areas on the airport map at a third zoom level that is less than the second zoom level; and
providing, by the map labeling control unit, fourth labels for fourth areas on the airport map at a fourth zoom level that is less than the third zoom level.

22. The method of claim 21, wherein the first areas at the first zoom level comprise major buildings, wherein the second areas at the second zoom level comprise major taxiways, wherein the third areas at the third zoom level comprise all shown taxiways and deicing locations, and wherein the fourth areas at the fourth zoom level comprise all shown parking stands.

23. A system comprising:
a map labeling control unit comprising a processor, wherein the map labeling control unit is configured to:
generate label candidates for areas of an airport map,
evaluate the label candidates to determine positions of labels for the areas of the airport map,
determine a quality metric for each of the label candidates, and
determine different sets of labels to display for different views of the airport map.

24. The system of claim 23, wherein the map labeling control unit is further configured to generate a conflict graph regarding the labels.

25. The system of claim 24, wherein the map labeling control unit is further configured to resolve conflicts among the labels.

26. A non-transitory computer-readable storage medium comprising executable instructions that, in response to execution, cause a map labeling control unit comprising a processor, to perform operations comprising:
generating label candidates for areas of an airport map;
evaluating the label candidates to determine positions of labels for the areas of the airport map, wherein said evaluating comprises determining a quality metric for each of the label candidates;
determining different sets of labels to display for different views of the airport map;
generating a conflict graph regarding the labels; and
resolving conflicts among the labels.

* * * * *